(12) United States Patent
Suzuki et al.

(10) Patent No.: US 7,203,727 B2
(45) Date of Patent: Apr. 10, 2007

(54) SERVICE EMAIL SYSTEM FOR TRANSMITTING ADVERTISEMENT EMAIL TO A GROUP OF TERMINALS ONLY IF TRANSFER CONSTRAINT AND TRANSMISSION CONDITIONS ARE SATISFIED

(75) Inventors: Shintaro Suzuki, Tokyo (JP); Takeshi Fukuizumi, Tokyo (JP)

(73) Assignee: NEC Corporation, Tokyo (JP)

( * ) Notice: Subject to any disclaimer, the term of this patent is extended or adjusted under 35 U.S.C. 154(b) by 805 days.

(21) Appl. No.: 10/366,417

(22) Filed: Feb. 14, 2003

(65) Prior Publication Data
US 2003/0158904 A1 Aug. 21, 2003

(30) Foreign Application Priority Data
Feb. 18, 2002 (JP) ............................. 2002-040740

(51) Int. Cl.
*G06F 15/16* (2006.01)
(52) U.S. Cl. ........................... 709/206; 705/14; 725/42
(58) Field of Classification Search ................ 709/206, 709/218, 219, 217; 705/26, 14, 2; 707/102, 707/1; 725/23, 42
See application file for complete search history.

(56) References Cited

U.S. PATENT DOCUMENTS

| | | | |
|---|---|---|---|
| 5,809,242 A * | 9/1998 | Shaw et al. ................. 709/217 |
| 6,606,745 B2 * | 8/2003 | Maggio ......................... 725/23 |
| 6,904,408 B1 * | 6/2005 | McCarthy et al. .............. 705/2 |
| 2001/0007097 A1 * | 7/2001 | Kim ............................. 705/14 |
| 2001/0044832 A1 * | 11/2001 | Cohn et al. ................. 709/217 |
| 2001/0047297 A1 * | 11/2001 | Wen ............................. 705/14 |
| 2002/0082941 A1 * | 6/2002 | Bird ............................. 705/26 |
| 2002/0087573 A1 * | 7/2002 | Reuning et al. ............ 707/102 |
| 2002/0120607 A1 * | 8/2002 | Price et al. .................... 707/1 |
| 2003/0009385 A1 * | 1/2003 | Tucciarone et al. ........... 705/26 |
| 2003/0046160 A1 * | 3/2003 | Paz-Pujalt et al. ............ 705/14 |

FOREIGN PATENT DOCUMENTS

| | | |
|---|---|---|
| CN | 1204917 A | 1/1999 |
| JP | 2001-92887 A | 4/2001 |
| JP | 2001-154942 A | 6/2001 |
| JP | 2001-209683 A | 8/2001 |
| JP | 2001-290994 A | 10/2001 |

* cited by examiner

Primary Examiner—Le Hien Luu
(74) Attorney, Agent, or Firm—Sughrue Mion, PLLC

(57) ABSTRACT

A service e-mail providing system includes n (n is an integer more than m, and m is an integer more than 1) terminals which are connected a communication network. An e-mail server is connected with the communication network, and has an e-mail database in which a service e-mail and an advertisement e-mail are stored, and the advertisement e-mail contains advertisement data. The e-mail server transmits the advertisement e-mail to a first one of m terminal of the n terminals, such that the advertisement e-mail are transferred between the m terminals, users of the m terminals satisfying the transfer constraint condition. When a transmission condition is satisfied during the transfer of the advertisement e-mail, the e-mail server transmits the service e-mail to the m terminals.

38 Claims, 32 Drawing Sheets

Fig. 6

6: TRANSFER LOG

| E-MAIL ID | TRANSMISSION SOURCE E-MAIL ADDRESS | TRANSFER DESTINATION E-MAIL ADDRESS | TIME | LOCATION OF TRANSFER DESTINATION |
|---|---|---|---|---|
| 6-1 | 6-2 | 6-3 | 6-4 | 6-5 |
|  |  |  |  |  |

Fig. 7

55: TRANSFER LOG DATABASE

| E-MAIL ID | TRANSMISSION ORIGIN E-MAIL ADDRESS | TRANSFER DESTINATION E-MAIL ADDRESS | COUNTER | TIME | LOCATION OF TRANSFER DESTINATION | DELETE |
|---|---|---|---|---|---|---|
| | AAA@AAA | BBB@BBB | 1 | 2002.2.1.13:45 | SHIBUYA-KU, TOKYO | |
| | CCC@CCC | DDD@DDD | 2 | 2002.2.1.20:00 | TOKYO | |
| . | . | . | . | . | . | . |
| . | . | . | . | . | . | . |
| . | . | . | . | . | . | . |

57: TRANSFER CONSTRAINT DATABASE

| E-MAIL ID | LOCATION | TIME LIMIT | CONSTRAINT | |
|---|---|---|---|---|
| | | | 57-4 | |
| | 57-2 | 57-3 | PERSONAL PROFILE | |
| 57-1 | =TOKYO<br>NOT: HOKKAIDO | 2002.2.8.21:00 | =WOMAN<br>NOT: MAN &/OR NOT: MARRIAGE &/OR NOT: | =SINGLE<br>=MOVIE FUN<br>NOT: VIDEO VIEWING |
| . | . | . | . | . |
| . | . | . | . | . |
| . | . | . | . | . |

Fig. 9

58: SERVICE E-MAIL TRANSMISSION CONDITION DATABASE

| E-MAIL ID | PERSONS | LOCATION | TIME LIMIT | CONSTRAINT | |
|---|---|---|---|---|---|
| | | | | \ 58-5 | |
| | | | | CONSTRAINT | PERSONAL PROFILE |
| 58-1 | 58-2 | 58-3 | 58-4 | | |
| | 100 | =TOKYO<br>NOT: HOKKAIDO | 2002.2.8.21:00 | = WOMAN<br>NOT: MAN &/OR NOT: MARRIAGE &/OR NOT: VIDEO VIEWING | = SINGLE = MOVIE FUN |
| . | . | . | . | . | . |
| . | . | . | . | . | . |
| . | . | . | . | . | . |

Fig. 10

59: PERSONAL PROFILE DATABASE

| E-MAIL ADDRESS | TELEPHONE No. | NAME | SEXUALITY | INTEREST | OCCUPATION | MARRIAGE | AGE |
|---|---|---|---|---|---|---|---|
| ∗∗∗@∗∗∗∗ | 090-∗∗∗∗-∗∗∗∗ | (CLIENT NAME) | MAN | MOVIE | OFFICE WORKER (ABC RESEARCH COMPANY) | MARRIAGE | 45 |
| ∗∗×@∗∗×× | 090-∗××-∗∗×× | (ADVERTISER NAME) | MAN | MOVIE | OFFICE WORKER (DEF CO, LTD) COMPANY) | MARRIAGE | 39 |
| EEE@EEE | 090-1111-1111 | FF FF | MAN | VIDEO VIEWING | WORKER | SINGLE | 27 |
| ×××@×××× | 090-2222-2222 | GG GG | WOMAN | MOVIE | WORKER | SINGLE | 23 |
|  |  |  |  |  |  |  |  |
|  |  |  |  |  |  |  |  |
|  |  |  |  |  |  |  |  |

NOTICE FROM ABC RESEARCH COMPANY

PREVIEW OF "XXXX" IS HELD AT YY HALL
(PM 6:30 START) ON FEBRUARY 15, 2002.

WE PRESENT INVITATION TICKETS TO 20 PAIRS.
PLEASE CONTACT THE FOLLOWING ADDRESS,
IF YOU HAVE INTEREST.
WE STOP THE RECEPTION WHEN DELIVERY
OF THE INVITATION TICKETS IS COMPLETED.
PLEASE CONTACT US AS SOON AS POSSIBLE.

RECEPTION START: FEBRUARY 9, 2002
                 FROM 9:00 AM

ADDRESS: ABCDEFG

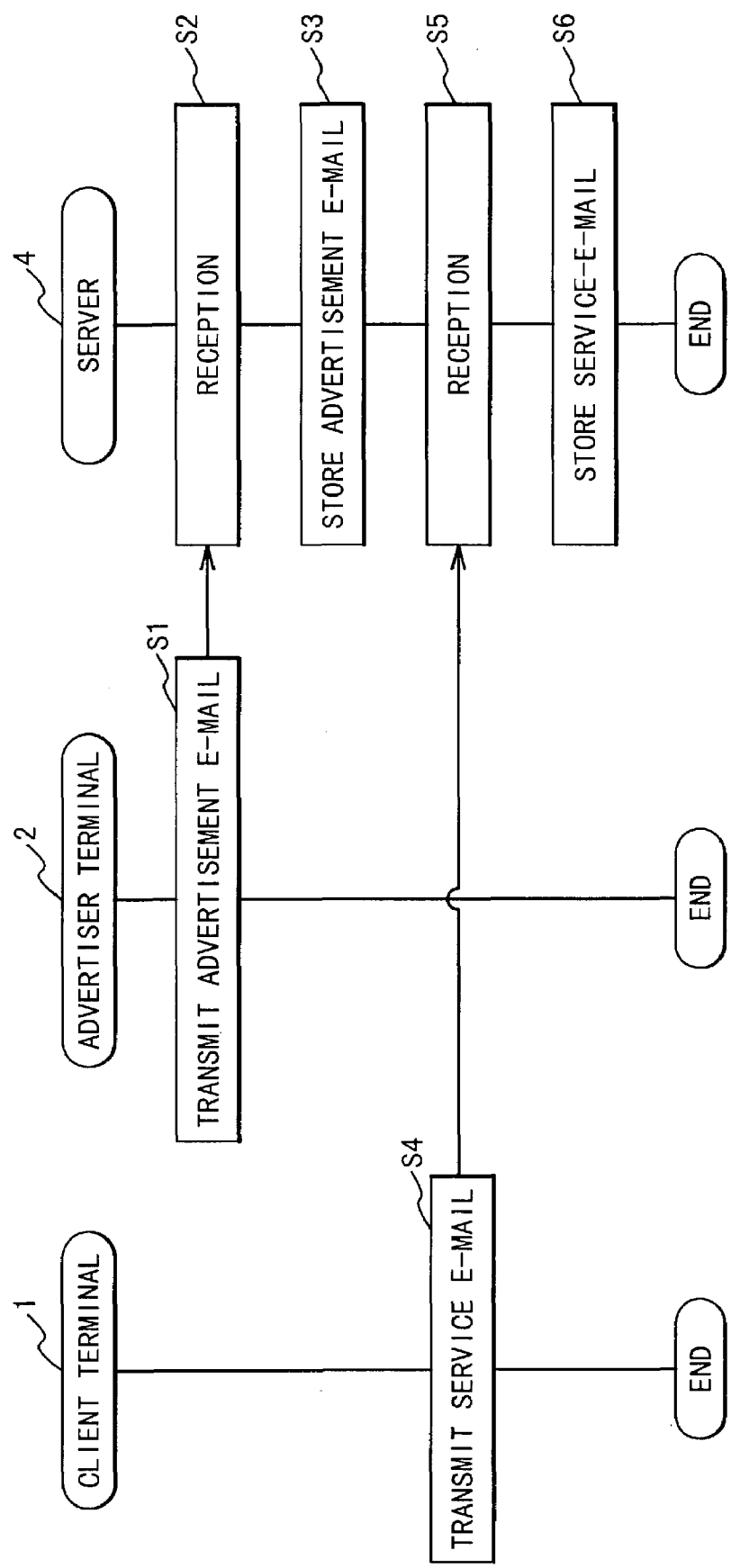

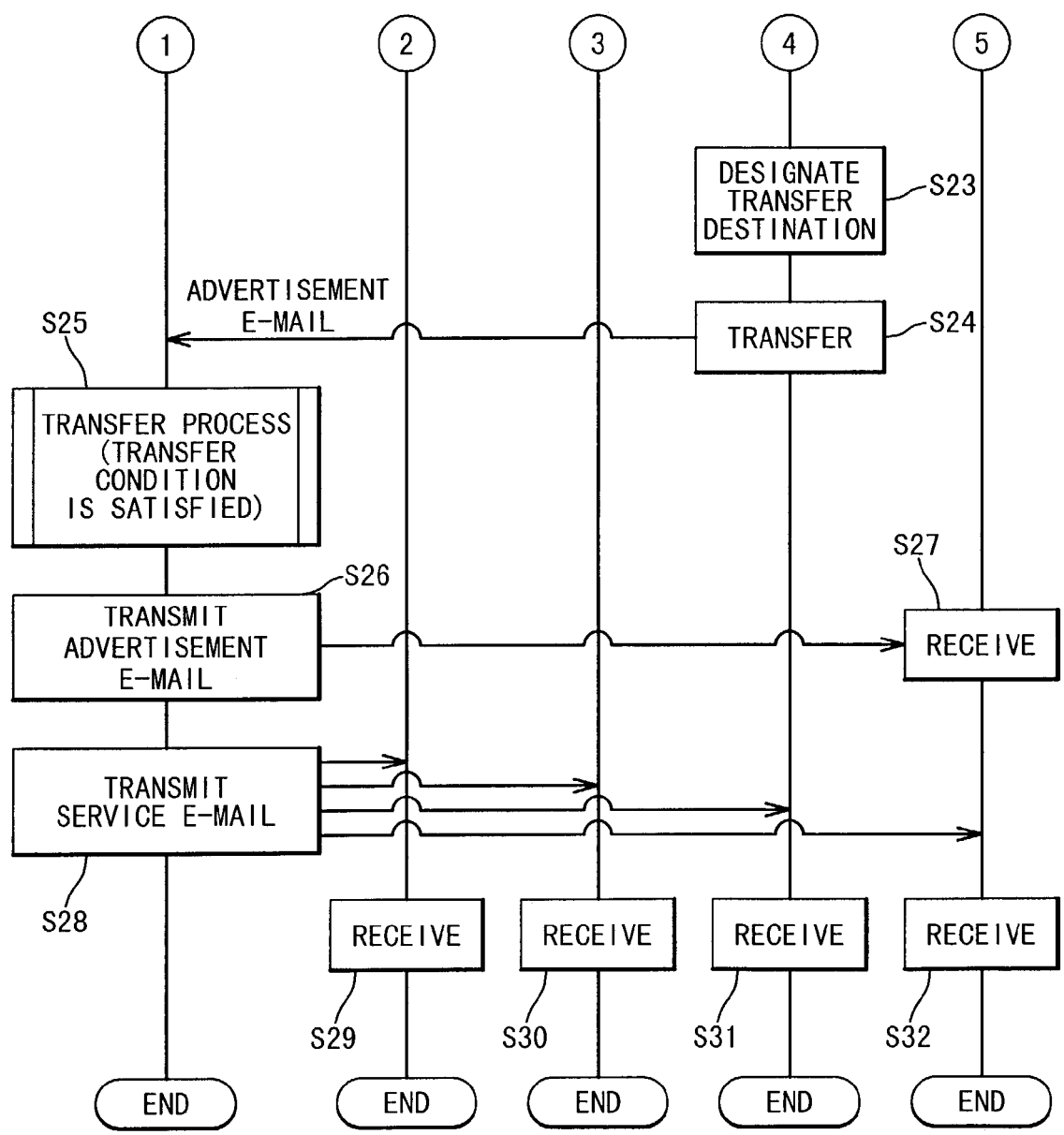

SERVICE EMAIL SYSTEM FOR TRANSMITTING ADVERTISEMENT EMAIL TO A GROUP OF TERMINALS ONLY IF TRANSFER CONSTRAINT AND TRANSMISSION CONDITIONS ARE SATISFIED

BACKGROUND OF THE INVENTION

1. Field of the Invention

The present invention relates to an e-mail server and a service e-mail providing system using the same.

2. Description of the Related Art

A direct mail is implemented to deliver an advertisement directly to many persons using e-mail on the Internet. In this method, however, an originator of the direct mail can deliver only to previously registered mail addresses. A new direct e-mail delivery system is demanded in which the advertisement can be delivered to persons who are not registered.

In conjunction with the above description, a network system is disclosed in Japanese Laid Open Patent Application (JP-P2001-92887). In this conventional reference, information with a high incentive is provided as the number of terminals which log in a system is increased. For this purpose, in the network system of this conventional reference, the server includes a request receiving section, a data transmitting section, an incentive providing section, a request counting section and an incentive changing section. The request receiving section receives a service request transmitted from each of a plurality of terminals via a network. The data transmitting section transmits data to the terminal from which the service request is received. The incentive providing section provides a predetermined incentive to at least a part of the terminals from which the service requests are received. The request counting section counts the number of the terminals from which the service requests are received. The incentive changing section changes the content of the incentive provided from the incentive providing section based on the count by the request counting section.

Also, an information link system is disclosed in Japanese Laid Open Patent Application (JP-P2001-154942). In this conventional reference, an initial e-mail with link data is transmitted to a terminal with an optional e-mail address. When being accessed from the terminal, a host apparatus instructs the terminal to input an e-mail address of a destination terminal and a main sentence. The e-mail main sentence is stored in the host apparatus. Only the link data to the main sentence stored in the host apparatus is transmitted to the destination terminal by an e-mail. The destination terminal accesses the host apparatus based on the link data to view the main sentence. The host apparatus manages the e-mail addresses, and may stop the transfer of the e-mail when the e-mail has been transferred a predetermined number of times.

Also, an advertisement system is disclosed in Japanese Laid Open Patent Application (JP-P2001-209683). In this conventional reference, advertisement data is provided to a user terminal via a network. The advertisement data is managed. When the user terminal transmits the advertisement data to another user terminal, an identifier of the user terminal is added to the advertisement data. A point is given to a user of the user terminal.

Also, a guide system is disclosed in Japanese Laid Open Patent Application (JP-P2001-290994). In this conventional reference, the existence of a home page with an incentive is notified to many terminals by a chain mail.

SUMMARY OF THE INVENTION

Therefore, an object of the present invention is to provide a service e-mail providing system, in which it is possible to deliver advertisement or information to persons who are not registered, in addition to persons previously registered.

Also, another object of the present invention is to provide an e-mail server used in the above service e-mail providing system.

In an aspect of the present invention, a service e-mail providing system includes n (n is an integer more than m, and m is an integer more than 1) terminals which are connected a communication network. An e-mail server is connected with the communication network, and has an e-mail database in which a service e-mail and an advertisement e-mail are stored, and the advertisement e-mail contains advertisement data. The e-mail server transmits the advertisement e-mail to a first one of m terminal of the n terminals, such that the advertisement e-mail are transferred between the m terminals, users of the m terminals satisfying a transfer constraint condition. When a transmission condition is satisfied during the transfer of the advertisement e-mail, the e-mail server transmits the service e-mail to the m terminals.

Here, the e-mail server has a service e-mail transmission condition database which stores the transmission condition, and the transmission condition contains a predetermined count value. The e-mail server determines that the transmission condition is satisfied, when a number of times of the transfer of the advertisement e-mail reaches the predetermined count value. In this case, the transmission condition contains a transfer time limit in addition to the predetermined count value. The e-mail server determines that the transmission condition is satisfied, when the number of times of the transfer of the advertisement e-mail reaches the predetermined count value, before the transfer time limit passed away. Also, the e-mail server determines that the transmission condition is not satisfied, when the number of times of the transfer of the advertisement e-mail does not reach the predetermined count value, before the transfer time limit passed away. The e-mail server transmits a consolation e-mail to ones of the m terminals to which the advertisement e-mail has been transferred.

Also, the e-mail server receives a specific e-mail, when a transfer source terminal as one of the m terminals transfers the advertisement e-mail to a transfer destination terminal as another of the m terminals, while the advertisement e-mail is transferred between the m terminals. The e-mail server checks whether the transmission condition is satisfied, when the specific e-mail is received by the e-mail server. In this case, the specific e-mail may be the advertisement e-mail. Or, the specific e-mail may be a copy of the advertisement e-mail.

Also, the e-mail server may extract an e-mail address of the transfer source terminal and an e-mail address of the transfer destination terminal from the received specific e-mail. When the transfer condition is satisfied, the e-mail server may transmit the service e-mail to the m terminals based on the e-mail addresses extracted during the transfer of the advertisement e-mail between the m terminal. In this case, the e-mail server may check whether the e-mail address of the extracted transfer destination terminal is coincident with any of e-mail addresses already extracted. When the e-mail address of the extracted transfer destination terminal is coincident with any of e-mail addresses already extracted, the e-mail server transmits a first alert e-mail to the transfer source terminal to instruct the transfer source terminal to set an e-mail address of another terminal in the advertisement e-mail instead of the e-mail address currently set.

Also, the transfer constraint condition may contain a predetermined destination location. The e-mail server checks whether a location of the transfer destination terminal satisfies the predetermined destination location. When the location of the transfer destination terminal does not satisfy the predetermined destination location, the e-mail server transmits a second alert to the transfer source terminal to instruct the transfer source terminal to set an e-mail address of another terminal located in the predetermined destination location in the advertisement e-mail instead of the e-mail address currently set.

Also, the transfer constraint condition may contain a predetermined attribute of the user. The e-mail server checks whether an attribute of the user of the transfer destination terminal satisfies the predetermined attribute of the user. When the attribute of the user of the transfer destination terminal does not satisfy the predetermined attribute of the user, the e-mail server may transmit a third alert to the transfer source terminal to instruct the transfer source terminal to set in the advertisement e-mail instead of the e-mail address currently set, an e-mail address of another terminal whose user satisfies the predetermined attribute.

Also, the e-mail server may hold a count value of a number of times of the transfer of the advertisement e-mail. The transfer destination terminal displays the advertisement e-mail when receiving the advertisement e-mail, and generates a progress inquiry notice in response to an operation of the transfer destination terminal. The e-mail server transmits the count value to the transfer destination terminal in response to the progress inquiry notice. The transfer destination terminal displays the count value.

Also, the service e-mail providing system may further include a fee charging section which transmits a communication fee e-mail notice for the advertisement e-mail to the m terminals. In this case, when the fee charging section receives an account change notice from one of the m terminals before transmitting the communication fee e-mail notice to the one terminal, the fee charging section may transmit the communication charge e-mail to the one terminal.

Also, the service e-mail providing system may further include first and second terminals. The first terminal transmits the service e-mail to the e-mail server. The second terminal transmits an e-mail containing specific data and a condition e-mail containing the transmission condition and the transfer constraint condition to the e-mail server. The e-mail server produce the advertisement e-mail based on the specific data, the transmission condition and the transfer constraint condition.

Also, the service e-mail providing system may further include first and second terminals. The first terminal transmits the service e-mail and a condition e-mail containing the transmission condition and the transfer constraint condition to the e-mail server, and the second terminal transmits an e-mail containing specific data to the e-mail server. The e-mail server produce the advertisement e-mail based on the specific data, the transmission condition and the transfer constraint condition.

In another aspect of the present invention, an e-mail transfer server connected with n terminals (n is an integer more than 2) via a communication network, includes an e-mail database which stores a service e-mail and an advertisement e-mail; an advertisement e-mail transmitting section, an advertisement e-mail receiving section, an address extracting section and a service e-mail transmitting section. The advertisement e-mail transmitting section transmits an advertisement e-mail to a first terminal of the n terminals. The advertisement e-mail receiving section receives the advertisement e-mail while the advertisement e-mail is sequentially transferred from a transfer source terminal of the n terminals to a transfer destination terminal of the n terminals, the received advertisement e-mail contains an e-mail addresses of the transfer source terminal and an e-mail address of the transfer destination terminal. The address extracting section extracts the e-mail addresses of the transfer source terminal and the transfer destination terminal from the received advertisement e-mail. The service e-mail transmitting section transmits the service e-mail to the n terminals based on the extracted e-mail addresses when a transmission condition of the service e-mail is satisfied, and the n terminals satisfies a transfer constraint condition of the advertisement e-mail.

The e-mail transfer server may further include a condition determining section. The advertisement e-mail contains a predetermined transfer count value as the transmission condition. The condition determining section checks whether the current transfer count value satisfies the predetermined transfer count value. The service e-mail transmitting section transmits the service e-mail to the n terminals based on the extracted e-mail addresses when the current transfer count value satisfies the predetermined transfer count value. In this case, the e-mail transfer server may further include a monitoring section; and a consolation e-mail transmitting section. The transmission condition contains a predetermined time limit, and the monitoring section checks whether a predetermined time limit passed. The consolation e-mail transmitting section transmits a consolation e-mail to the n terminals based on the extracted e-mail addresses to notify that the transmission condition is not satisfied when the predetermined time limit passed without satisfying the predetermined transfer count value.

Also, the condition determining section may determine whether the e-mail address of the transfer destination terminal is equal to any of e-mail addresses already extracted when the address extracting section extracts the e-mail address of the transfer destination terminal from the received advertisement e-mail. When the e-mail address of the transfer destination terminal is equal to any of the e-mail addresses already extracted, the advertisement e-mail transmitting section transmits a first alert e-mail to the transfer source terminal to instruct the transfer source terminal to set in the advertisement e-mail, an e-mail address of another transfer destination terminal other than terminals corresponding to the e-mail addresses already extracted.

Also, a current destination location of the transfer destination terminal may be contained in the received advertisement e-mail. The transfer constraint condition contains transfer constraint condition which contains a predetermined destination location. The condition determining section checks whether the current destination location satisfies the predetermined destination location. when the current destination location does not satisfy the predetermined destination location, the advertisement e-mail transmitting section transmits a second alert e-mail to the transfer source terminal to instruct the transfer source terminal to set in the advertisement e-mail, an e-mail address of another transfer destination terminal satisfying the predetermined destination location.

Also, the transfer constraint condition may contain a predetermined attribute. The condition determining section may check whether an attribute of a user of the transfer destination terminal satisfies the predetermined attribute. When the attribute of the destination does not satisfy the predetermined attribute, the advertisement e-mail transmitting section transmits a third alert e-mail to the transfer source terminal to instruct the transfer source terminal to set in the advertisement e-mail, an e-mail address of another transfer destination terminal satisfying the predetermined attribute.

Also, the advertisement e-mail received by the advertisement e-mail receiving section may be a copy of the advertisement e-mail which is transferred from the transfer source terminal to the transfer destination terminal. Also, the advertisement e-mail transmitting section writes the current transfer count value in the advertisement e-mail transferred to the transfer destination terminal, and the current transfer count value is j+1.

Also, the advertisement e-mail receiving section may receive a transfer count value inquiry notice from the transfer destination terminal. The advertisement e-mail transmitting section transmits the current transfer count value to the transfer destination terminal in response to transfer count value inquiry notice.

Also, the e-mail transfer server may further include a fee charging section which transmits a communication fee notice showing a communication fee of the advertisement e-mail. In this case, the fee charging section may transmit the communication fee notice to one of the n terminals when receiving an account change notice from the one terminal of the n terminals, before transmitting the communication fee notice to the one terminal.

In a still another aspect, the present invention relates to a recording medium storing a program for an e-mail transfer method in an e-mail server connected with n terminals (n is an integer more than 2) via a communication network. The method may be achieved by (a) transmitting an advertisement e-mail to a first terminal of the n terminals; by (b) receiving the advertisement e-mail while the advertisement e-mail is sequentially transferred from a transfer source terminal of the n terminals to a transfer destination terminal of the n terminals, the received advertisement e-mail contains an e-mail addresses of the transfer source terminal and an e-mail address of the transfer destination terminal; by (c) extracting the e-mail addresses of the transfer source terminal and the transfer destination terminal from the received advertisement e-mail; and by (d) transmitting a service e-mail to the n terminals based on the extracted e-mail addresses when a transmission condition of the service e-mail is satisfied, and the n terminals satisfies a transfer constraint condition of the advertisement e-mail.

Here, the advertisement e-mail may contain a predetermined transfer count value as the transmission condition. The method further may include: checking whether the current transfer count value satisfies the predetermined transfer count value. The (d) transmitting step includes transmitting the service e-mail to the n terminals based on the extracted e-mail addresses when the current transfer count value satisfies the predetermined transfer count value.

Also, the transmission condition may contain a predetermined time limit. The method may further include checking whether a predetermined time limit passed; and transmitting a consolation e-mail to the n terminals based on the extracted e-mail addresses to notify that the transmission condition is not satisfied when the predetermined time limit passed without satisfying the predetermined transfer count value.

Also, the method may further include: checking whether the e-mail address of the transfer destination terminal is equal to any of e-mail addresses already extracted when the address extracting section extracts the e-mail address of the transfer destination terminal from the received advertisement e-mail; and when the e-mail address of the transfer destination terminal is equal to any of the e-mail addresses already extracted, transmitting a first alert e-mail to the transfer source terminal to instruct the transfer source terminal to set in the advertisement e-mail, an e-mail address of another transfer destination terminal other than terminals corresponding to the e-mail addresses already extracted.

Also, a current destination location of the transfer destination terminal may be contained in the received advertisement e-mail. The transfer constraint condition contains transfer constraint condition which contains a predetermined destination location. The method may further include: checking whether the current destination location satisfies the predetermined destination location; and when the current destination location does not satisfy the predetermined destination location, transmitting a second alert e-mail to the transfer source terminal to instruct the transfer source terminal to set in the advertisement e-mail, an e-mail address of another transfer destination terminal satisfying the predetermined destination location.

Also, the transfer constraint condition may contain a predetermined attribute. The method may further includes: checking whether an attribute of a user of the transfer destination terminal satisfies the predetermined attribute; and when the attribute of the destination does not satisfy the predetermined attribute, transmitting a third alert e-mail to the transfer source terminal to instruct the transfer source terminal to set in the advertisement e-mail, an e-mail address of another transfer destination terminal satisfying the predetermined attribute.

Also, the received advertisement e-mail may be a copy of the advertisement e-mail which is transferred from the transfer source terminal to the transfer destination terminal.

Also, the current transfer count value may be written in the advertisement e-mail transferred to the transfer destination terminal, and the current transfer count value is j+1.

Also, the method may further includes transmitting the current transfer count value to the transfer destination terminal in response to transfer count value inquiry notice, from the transfer destination terminal.

Also, the recording medium may further include:

transmitting a communication fee notice showing a communication fee of the advertisement e-mail. In this case, the method may further include: transmitting the communication fee notice to one of the n terminals when receiving an account change notice from the one terminal of the n terminals, before transmitting the communication fee notice to the one terminal.

BRIEF DESCRIPTION OF THE DRAWINGS

FIG. 6 is a diagram showing the concept of a transfer log used in the first embodiment of the present invention;

FIG. 7 is a diagram showing a transfer log database in the first embodiment of the present invention;

FIG. 8 is a diagram showing a transfer constraint condition database in the first embodiment of the present invention;

FIG. 9 is a diagram showing a service e-mail transmission condition database in the first embodiment of the present invention;

FIG. 10 is a diagram showing an personal profile database in the first embodiment of the present invention;

FIG. 11 is a diagram showing a service e-mail in the first embodiment of the present invention;

FIG. 13 is a flow chart showing an initial operation of the e-mail transfer system according to first embodiment of the present invention;

FIGS. 14A to 14C are flow charts showing the operation of the e-mail transfer system according to first embodiment of the present invention;

DESCRIPTION OF THE PREFERRED EMBODIMENTS

Hereinafter, a service e-mail providing system of the present invention will be described in detail with reference to the attached drawings.

(First Embodiment)

Figure 1:
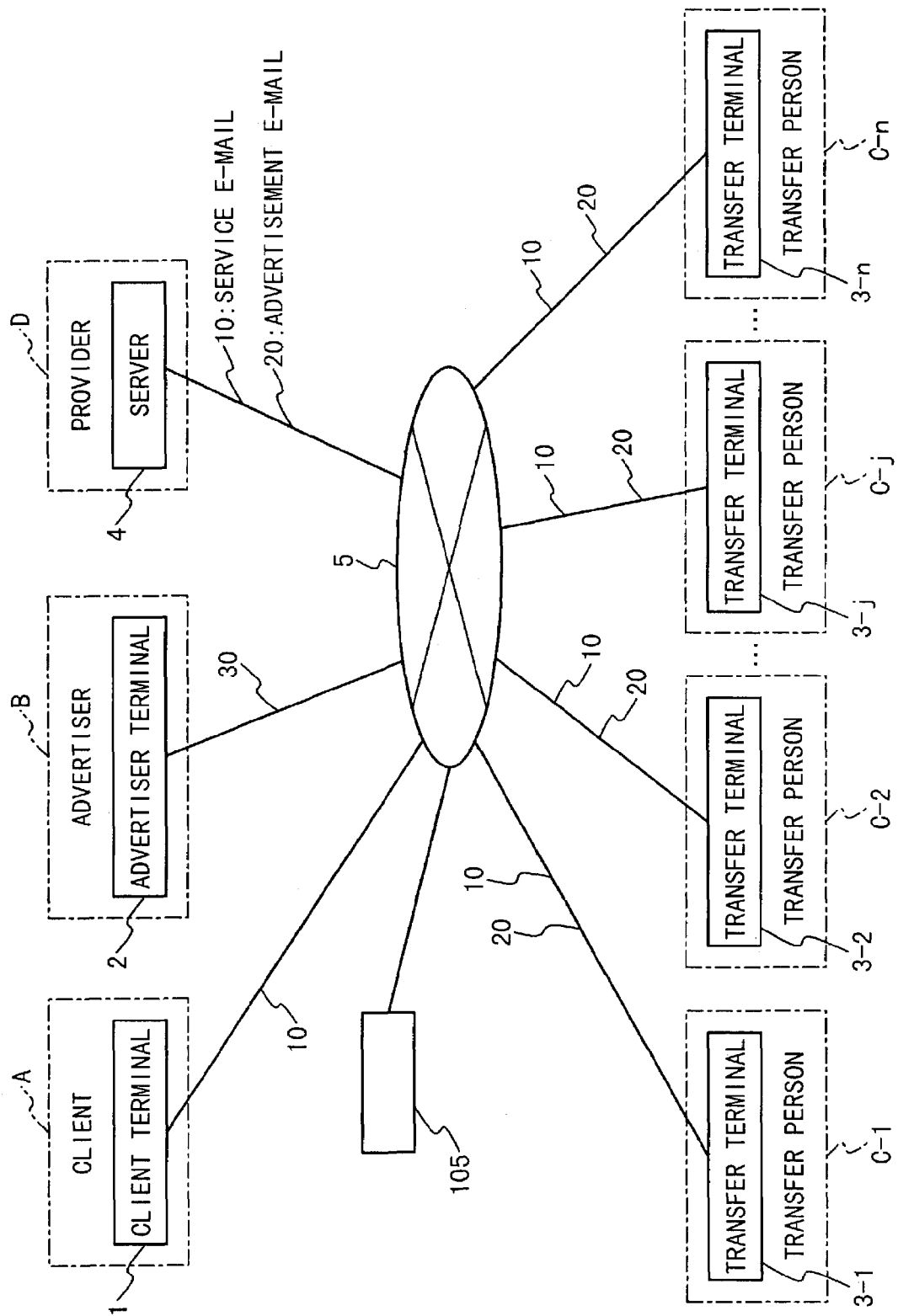
FIG. 1 is a block diagram showing the structure of an e-mail transfer system according to a first embodiment of the present invention.

FIG. 1 is a block diagram showing the structure of the service e-mail providing system according to the first embodiment of the present invention. The service e-mail providing system in the first embodiment is composed of a client terminal 1, an advertiser terminal 2, first to n-th transfer terminals 3-1 to 3-n (n is an integer equal to or more than 2), an e-mail server 4, and a communication network 5. A location specifying section 105 is connected with the communication network 5. The location specifying section 105 includes a base station and a satellite. The communication network 5 connects the client terminal 1, the advertiser terminal 2, the transfer terminals 3 (3-1, 3-2, . . . , 3-n), the e-mail server 4, and the location specifying section 105.

A client A has the client terminal 1. The mail address of the client terminal 1 is previously registered to a provider D by the client A. A advertiser B has the advertiser terminal 2, and the e-mail address of the advertiser terminal 2 is previously registered to the provider D by the advertiser B. The provider D has the e-mail server 4. Different transfer persons C (C-1, C-2, . . . , C-n) have the transfer terminals 3 (3-1, 3-2, . . . , 3-n), respectively. The e-mail addresses of the transfer terminals 3 are determined by the transfer persons C and registered, respectively. The e-mail addresses of these transfer terminals 3 are different, respectively. The transfer persons C are friends and know the e-mail addresses of a part of the transfer terminals 3 at least. For example, even if the transfer person C-1 does not know the e-mail address of the transfer person C-3, the transfer person C-1 knows the e-mail address of the transfer person C-2, vice versa. Also, the transfer person C-2 knows the e-mail address of the transfer person C-3. Also, for example, the client A and the advertiser B know the e-mail address of the transfer terminal 3-1 but do not know the e-mail addresses of the transfer terminals 3-2, . . . , 3-n.

The client transmits a service e-mail 10 to the e-mail server 4 using the client terminal 1 to notice a preview of a movie, for example. The service e-mail 10 may contain data relating to incentive matters for a promotion, a discount guide, and an invitation ticket. The advertiser B views the service e-mail 10 and produce an e-mail 30 containing advertisement data and a condition e-mail. The e-mail containing the advertisement data and the condition e-mail are transmitted from the advertiser terminal 2 to the e-mail server 4. The e-mail 30 of the advertisement data contains an advertisement, a commercial program, and a poster. Also, the condition e-mail contains a transmission condition of the service e-mail 10 and a transfer constraint condition of the advertisement e-mail 20. An advertisement e-mail 20 is produced based on the e-mail 30 and the condition e-mail and is first transmitted to the transfer person C-1 and then relayed from the transfer person C-1 to many transfer persons C-2, . . . , C-n based on the transfer constraint condition. Thus, in the present invention, the advertisement data of the advertiser B can be delivered to the transfer persons C-2, . . . , C-n, who are not registered on the advertiser terminal 2, in addition to the transfer person C-1, who is registered on the advertiser terminal 2.

The e-mail server 4 has an e-mail database and a transfer log database. The e-mail server 4 receives the service e-mail 10 from the client terminal 1 and registers on the e-mail database. Also, the e-mail server 4 receives the e-mail 30 and the condition e-mail containing the transmission condition of the service e-mail 10 and the transfer constraint condition of the advertisement e-mail 20 from the advertiser terminal 2, and produces and registers the advertisement e-mail on the e-mail database. The e-mail server 4 transmits the advertisement e-mail 20 to a predetermined one of the transfer terminals 3, e.g., the transfer terminal 3-1. The advertisement e-mail 20 is an e-mail relating to the service e-mail 10 and an e-mail to notify the transmission of the service e-mail 10 previously, and contains the transmission condition of the service e-mail 10 and the transfer constraint condition of the advertisement e-mail 20.

Thereafter, the advertisement e-mail 20 is sequentially transferred from the transfer terminal 3-j ($1 \leq j \leq n-1$ and j is an integer) as a transfer source terminal to the transfer terminal 3-(j+1) as a transfer destination terminal among the transfer terminals 3 through the e-mail server 4. The advertisement e-mail 20 has a transfer log containing the e-mail addresses of the transfer terminal 3-j and the transfer terminal 3-(j+1). When the advertisement e-mail 20 is transferred from the transfer terminal 3-j to the transfer terminal 3-(j+1) through the e-mail server 4, the e-mail server 4 receives the advertisement e-mail 20 from the transfer terminal 3-j. The e-mail server 4 extracts the e-mail addresses of the transfer terminal 3-j and transfer terminal 3-(j+1) from the transfer log of the advertisement e-mail 20, and registers the extracted e-mail addresses on the transfer log database as a transfer log.

The e-mail server 4 checks whether the transfer person C-(j+1) of the transfer destination terminal 3-(J+1) satisfies the transfer constraint condition. When the transfer constraint condition is not satisfied, the e-mail server 4 transmits an alert e-mail to the transfer terminal 3-j. The alert e-mail instructs that the e-mail address of the transfer terminal 3-(j+1) in the advertisement e-mail 20 from the transfer terminal 3-j should be replaced with an e-mail address of one of the transfer terminals 3 other than the terminals corresponding to the e-mail addresses registered on the transfer log database. Thus, an updated advertisement e-mail is produced, and the updated advertisement e-mail 20 is re-transmitted to the e-mail server 4.

Also, the e-mail server 4 checks whether the transmission condition is satisfied. When the transmission condition is satisfied, the e-mail server 4 reads out the service e-mail 10 from the e-mail database and transmits the service e-mail 10 to the transfer terminals 3 based on the e-mail addresses registered on the transfer log database.

As described above, according to the service e-mail providing system of the present invention, the client A can deliver the service e-mail 10 to the transfer persons C-2, . . . , C-n who are not registered on the client terminal 1, in addition to the transfer person C-1 who is registered on the client terminal 1.

Also, according to the service e-mail providing system of the present invention, it can be notified previously by the advertisement e-mail 20 containing the advertisement data of the advertiser B that the service e-mail 10 is transmitted to the transfer persons C. Therefore, the advertiser B can deliver the advertisement data such as the advertisement, commercial program, or a poster of the advertiser B to the transfer persons C-2, . . . , C-n, who are not registered on the advertiser terminal 2, in addition to the transfer person C-1, who is registered on the advertiser terminal 2.

Figure 2:
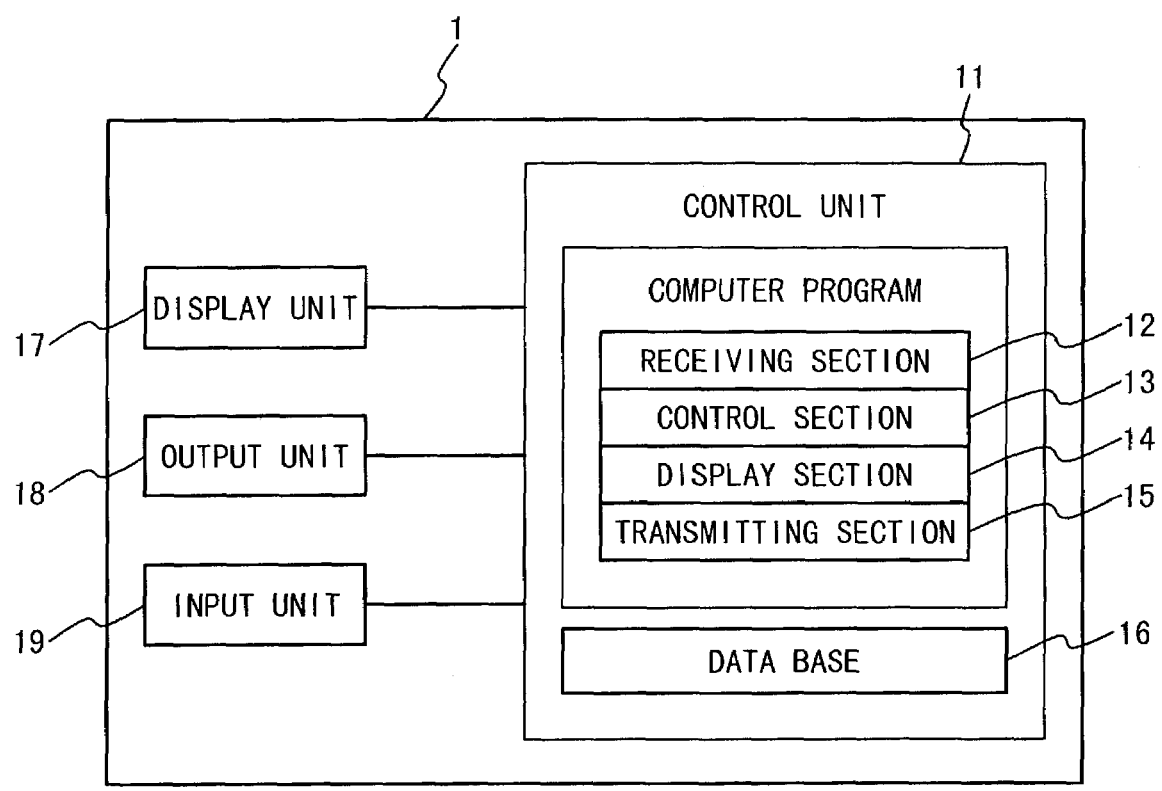
FIG. 2 is a block diagram showing the structure of a client terminal used in the e-mail transfer system according to the first embodiment of the present invention.

FIG. 2 is a block diagram showing the structure of the client terminal 1. The client terminal 1 is a terminal such as a personal computer, mobile terminal or portable phone which has an e-mail function. The client terminal 1 is composed of a control unit 11, a display unit 17, an output unit 18, and an input unit 19. The display unit 17 is a display containing a liquid crystal display. The output unit 18 contains a sound output unit which outputs a sound in case of the personal computer or the mobile terminal, and contains a speech receiving unit to receive a telephone speech and a sound output unit which outputs a sound in case of the portable phone. The input unit 19 contains a mouse and/or a keyboard to use an e-mail function in case of the personal computer or the mobile terminal, and contains an operation unit to use a telephone function and an e-mail function, and a microphone to transmit a speech in case of the portable phone.

The control unit 11 operates based on a computer programs (not shown), and is composed of a receiving section 12, a control section 13, a display section 14, a transmitting section 15, and a database 16. The control section 13 controls each of the units and sections in the client terminal 1. The control section 13 controls the output unit 18, the display section 14, and the transmitting section 15 in accordance with the operation of the input unit 19. The receiving section 12 receives an e-mail. The control section 13 registers the received e-mail on the database 16. The display section 14 displays the e-mail on the display unit 17. The transmitting section 15 transmits an e-mail in accordance with the operation of input unit 19.

Figure 3:
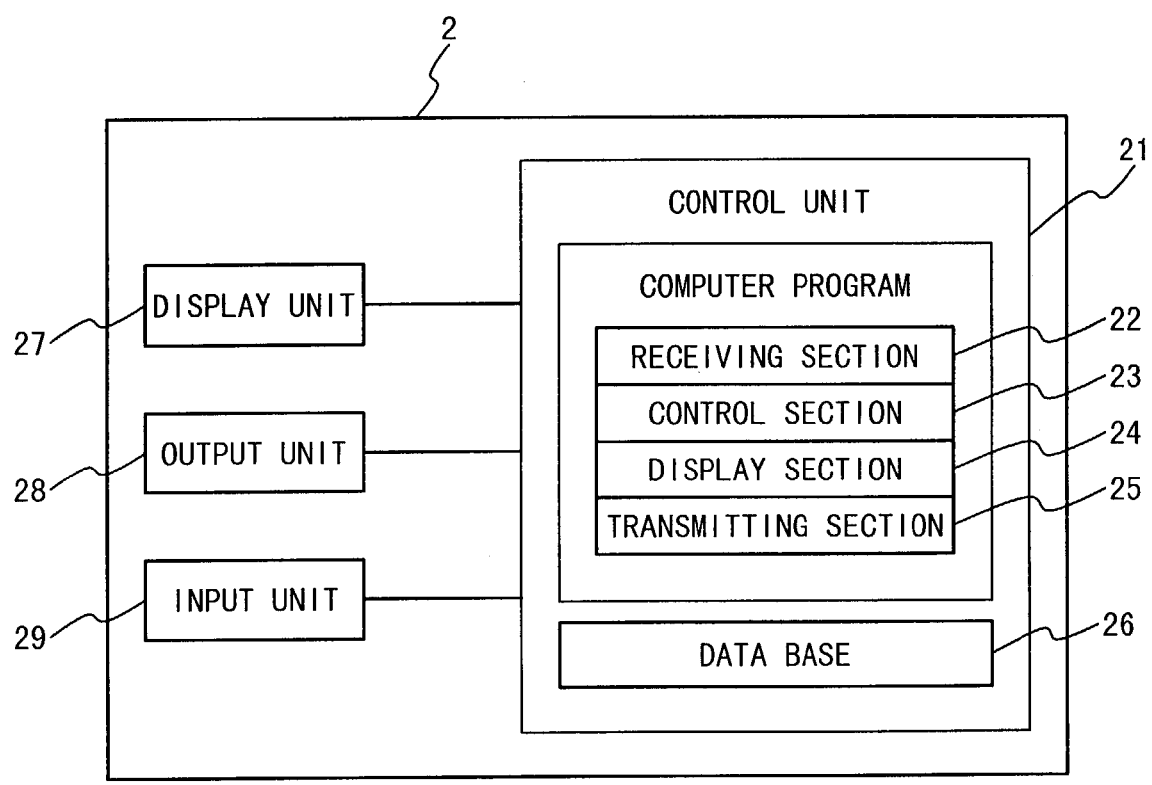
FIG. 3 is a block diagram showing the structure of a sponsor terminal used in the e-mail transfer system according to the first embodiment of the present invention.

FIG. 3 is a block diagram showing the structure of the advertiser terminal 2. The advertiser terminal 2 contains a personal computer, a mobile terminal or a portable phone, which has an e-mail function. The advertiser terminal 2 is composed of a control unit 21, a display unit 27, an output unit 28, and an input unit 29. The display unit 27 is a display containing a liquid crystal display. The output unit 28 contains a sound output unit which outputs a sound in case of the personal computer or the mobile terminal, and contains a speech receiving unit to receive a telephone speech, and a sound output unit which outputs a sound in case of the portable phone. The input unit 29 contains a mouse or a keyboard to use the e-mail function in case of the personal computer or the mobile terminal, and contains an operation unit to use the e-mail function, and a speech transmitting unit containing a microphone to transmit a telephone speech in case of the portable phone.

The control unit 21 is implemented by computer programs (not shown), and is composed of a receiving section 22, a control section 23, a display section 24, a transmitting section 25, and a database 26. The control section 23 controls each of the unit and sections of the advertiser terminal 2. The control section 23 controls the output unit 28, the display section 24, and the transmitting section 25 in accordance with the operation of the input unit 29. The receiving section 22 receives an e-mail. The control section 23 registers the received e-mail on the database 26. The display section 24 displays the e-mail on the display unit 27. The transmitting section 25 transmits an e-mail in accordance with the operation of input unit 29.

Figure 4:
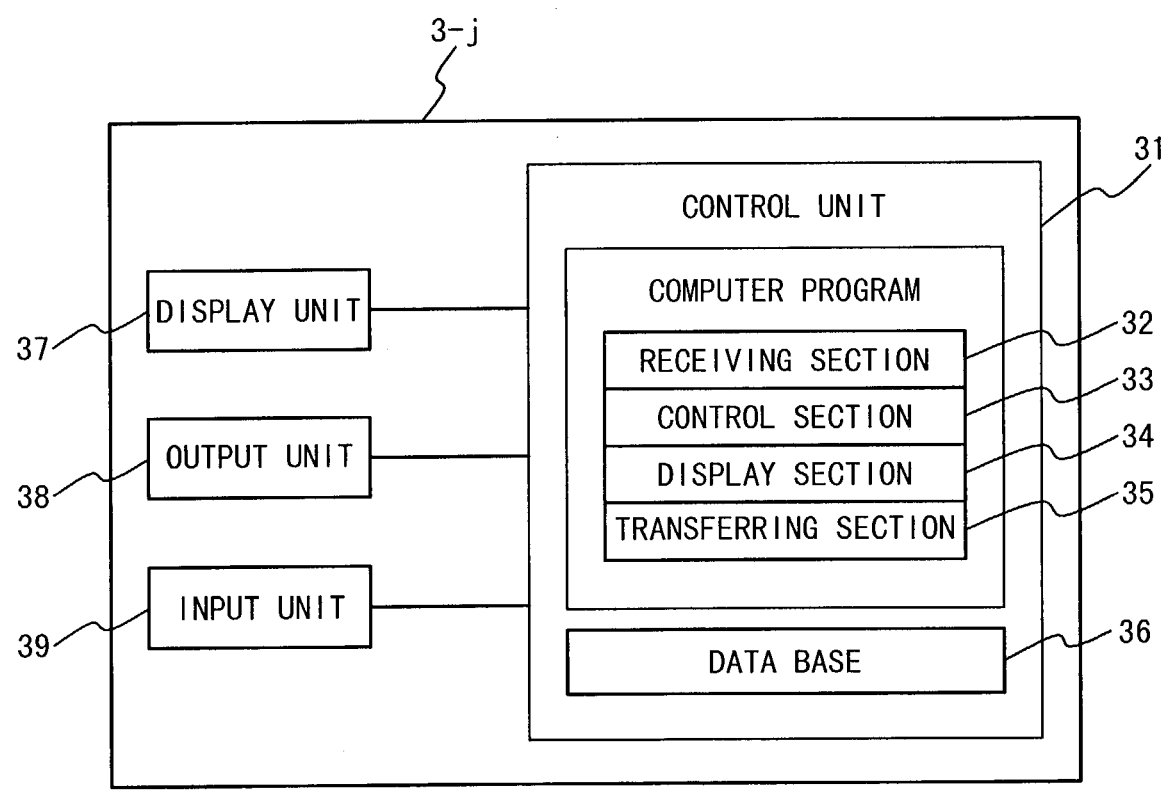
FIG. 4 is a block diagram showing the structure of a transfer terminal used in the e-mail transfer system according to the first embodiment of the present invention.

FIG. 4 is a block diagram showing the structure of the transfer terminal 3-j. The transfer terminal 3-j contains a personal computer, a mobile terminal or a portable phone, which has an e-mail function. The transfer terminal 3-j is composed of a control unit 31, a display unit 37, an output unit 38, and an input unit 39. The display unit 37 is a display containing a liquid crystal display. The output unit 38 contains a sound output unit which outputs a sound in case of the personal computer or the mobile terminal, and contains a speech receiving unit to receive a telephone speech and a sound output unit which outputs a sound in case of the portable phone. The input unit 39 contains a mouse or a keyboard to use the e-mail function in case of the personal computer or the mobile terminal, and contains an operation unit to use a telephone function and the e-mail function, and a speech transmitting unit containing a microphone to transmit telephone speech in case of the portable phone.

The control unit 31 is implemented by computer programs (not shown), and is composed of a receiving section 32, a control section 33, a display section 34, a transfer process section 35, and a database 36. The control section 33 controls each of the units and section of the transfer terminal. The control section 33 controls the output unit 38, the display section 34, and the transfer process section 35 in accordance with the operation of the input unit 39. The receiving section 32 receives an e-mail. The control section 33 registers the received e-mail on the database 36. The display section 34 displays the e-mail on the display unit 37. The transfer process section 35 transmits an e-mail in accordance with the operation of the input unit 39.

Here, in this embodiment, the transfer terminals 3-j (the transfer terminals 3-1, 3-2, . . . , 3-n) are portable phones in which e-mails can be used.

Figure 5:
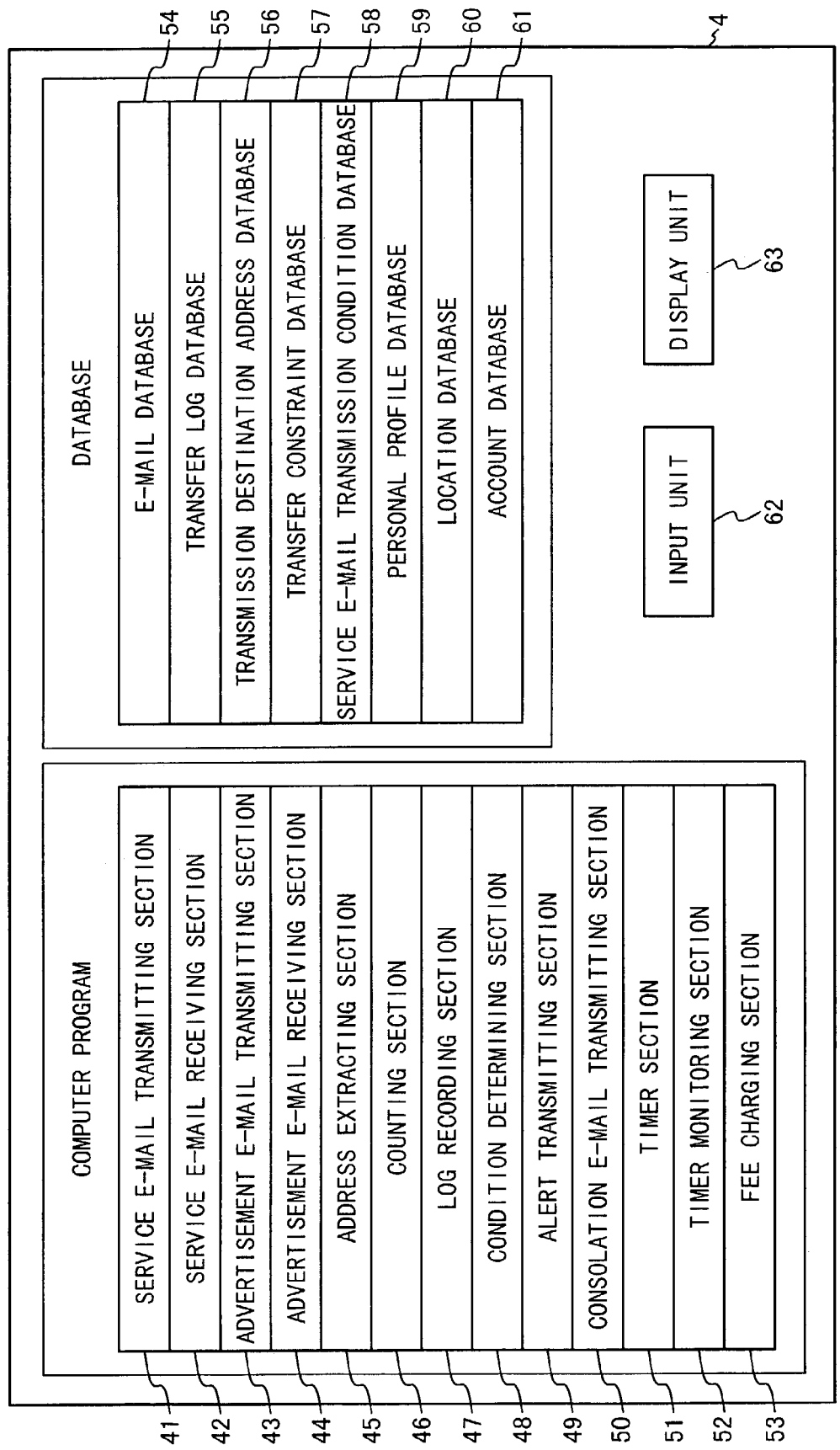
FIG. 5 is a block diagram showing the structure of an e-mail server used in the e-mail transfer system according to the first embodiment of the present invention.

FIG. 5 is a block diagram showing the structure of the e-mail server 4. The e-mail server 4 is composed of a service e-mail transmitting section 41, a service e-mail receiving section 42, a advertisement e-mail transmitting section 43, and a advertisement e-mail receiving section 44. Also, the e-mail server 4 is composed of an e-mail address extracting section 45, a counting section 46, a log recording section 47, and a condition determining section 48. Also, the e-mail server 4 is further composed of an alert transmitting section 49, a consolation e-mail transmitting section 50, a timer section 51, a timer monitoring section 52, and a fee charging section 53. The above sections 41 to 53 are achieved based on a computer program, which is stored a recording medium (not shown).

The e-mail server 4 has the above-mentioned e-mail database 54, the above-mentioned transfer log database 55, a transmission destination e-mail address database 56, a transfer constraint condition database 57, a service e-mail transmission condition database 58, an personal profile database 59, a location database 60, and a account database 61. Also, the e-mail server 4 is composed of an input unit 62 and a display unit 63. The input unit 62 contains a mouse or a keyboard. The display unit 63 is a display containing a liquid crystal display.

The advertisement e-mail receiving section 44 receives the e-mail 30 containing the advertisement data and the e-mail containing the transmission condition of the service e-mail 10 and the transfer constraint condition from the advertiser terminal 2. The e-mails are stored in the e-mail database 54. The transmission condition of the service e-mail 10 is stored in the service e-mail transmission condition database 58, and the transfer constraint condition of the advertisement e-mail 20 is stored in the transfer constraint condition database 57. The service e-mail receiving section 42 receives the service e-mail 10 from the client terminal 1 and stores in the e-mail database 54. The e-mail address of the transfer terminal 3-1 which has previously determined is registered on the transmission destination e-mail address database 56 as the transfer source terminal to which the advertisement e-mail transmitting section 43 first transmits the advertisement e-mail 20. The advertisement e-mail transmitting section 43 transmits the advertisement e-mail 20 containing the transmission condition of the service e-mail 10 and the transfer constraint condition of the advertisement e-mail 20.

The advertisement e-mail receiving section 44 receives a j-th advertisement e-mail 20 from the transfer terminal 3-j. The e-mail address extracting section 45 extracts the e-mail addresses of the transfer terminal 3-j and transfer terminal 3-(j+1) contained in the j-th advertisement e-mail 20 received by the advertisement e-mail receiving section 44.

The advertisement e-mail 20 has a transfer log 6 indicating that the advertisement e-mail 20 is transferred from the transfer terminal 3-j to the transfer terminal 3-(j+1). The transfer log is set or written by the transfer terminal 3-j. The transfer log 6 has the format as shown in FIG. 6. The transfer log 6 contains fields 6-1 to 6-5. The e-mail ID is registered on the field 6-1 by the advertisement e-mail transmitting section 43 to show an identification number of the advertisement e-mail 20. The e-mail address of the transfer terminal 3-j as a transmission source terminal is registered on the field 6-2. The e-mail address of the transfer terminal 3-(j+1) as the transfer destination terminal is registered on the field 6-3. The transfer time is registered in the field 6-4 to show a time when the advertisement e-mail 20 has been received from the transfer terminal 3-j by the advertisement e-mail receiving section 44. When the transfer terminal 3-(j+1) is a portable phone, a location of a transfer destination showing a location of the transfer terminal 3-(j+1) is registered on the field 6-5 by the advertisement e-mail receiving section 44. The location of the transfer terminal 3-(j+1) means the location of the transfer person C-(j+1) of the transfer terminal 3-(j+1).

When the transfer terminal 3-(j+1) is a portable phone, the advertisement e-mail 20 is transferred to the e-mail server 4 through the location specifying section 105. The advertisement e-mail receiving section 44 transmits a transfer destination location request to the location specifying section 105 based on the e-mail address of the transfer terminal 3-(j+1) extracted by the e-mail address extracting section 45. The transfer destination location request is used to require a location of the transfer destination of the transfer terminal 3-(j+1). The transfer destination location request contains the e-mail address of the transfer terminal 3-(j+1) and the e-mail address of the e-mail server 4. A control station of the location specifying section 105 acquires the strengths of radio wave emitted from the 3-(j+1) terminal from base stations based on the e-mail address of the transfer terminal 3-(j+1). Then, the control section determines the location of the transfer terminal 3-(j+1) from the strengths of the radio wave and transmits the determined location to the e-mail server 4 based on the e-mail address of the e-mail server 4 contained in the destination request. The location and identifier of the destination terminal are stored in the location database 60 as a set. The advertisement e-mail receiving section 44 refers to the location database 60 to recognize the destination terminal and registers the location of the transfer destination on the field 6-5. In the service e-mail providing system of the present invention, the registration of the location of the transfer destination is not limited to the above-mentioned method.

FIG. 7 shows the transfer log database 55. The transfer log database 55 contains the fields 55-1 to 55-7. When the advertisement e-mail transmitting section 43 transmits the advertisement e-mail 20 to the transfer terminal 3-1, a record of the first transfer log is recorded on the transfer log database 55 by the log recording section 47. The first transfer log is composed of an e-mail ID, the e-mail address of the e-mail server 4 as a source terminal, and an e-mail address of the transfer terminal 3-1 as a destination terminal. The first transfer log is also composed of a count value "1", and a transfer time showing a time when the advertisement e-mail transmitting section 43 transmits the advertisement e-mail 20 to the transfer terminal 3-1. The first transfer log is further composed of a destination location showing the location of the transfer person C-1 of the transfer terminal 3-1, when the transfer terminal 3-1 is a portable phone. These data are written in the fields 55-1, 55-2, 55-3, 55-4, 55-5, and 55-6 of the transfer log database 55. The count value "1" shows the first transfer log, and means the number of the transfer persons when the advertisement e-mail 20 is transferred among the transfer terminals. The count value is counted by the counting section 46. For example, in case of the count value of "1", the record of "e-mail ID", "AAA@AAA", "BBB@BBB", "1", "2002.2.1. 13:45", "Tokyo Shibuya", "(no code)" is registered on the fields 55-1, 55-2, 55-3, 55-4, 55-5, and 55-6, respectively, as shown in FIG. 7. Also, in case of the count value of "2", the record of "e-mail ID", "CCC@CCC", "DDD@DDD", "2", "2002.2.1. 20:00", "Tokyo . . . ", "(no code)" is registered on the fields 55-1, 55-2, 55-3, 55-4, 55-5, and 55-6, respectively, as shown in FIG. 7. The fields 55-1, 55-2, 55-3, 55-4 55-5, and 55-6 are not limited to this example.

The log recording section 47 reads the e-mail ID, the e-mail address of the transfer terminal 3-j as the source terminal, the e-mail address of the transfer terminal 3-(j+1) as the destination terminal, a transfer time, and a destination location of the destination terminal as the j-th transfer log 6 of the advertisement e-mail 20. The condition determining section 48 determines whether the e-mail address of the transfer terminal 3-(j+1) is coincident with any of the e-mail addresses registered on the field 55-3. For example, when the e-mail address of the transfer terminal 3-(j+1) is coincident with the e-mail address of the transfer terminal 3-1, the alert transmitting section 49 refers to the transfer log database 55 to determine the j-th transfer log 6. Then, the alert transmitting section 49 transmits an alert e-mail to the transfer terminal 3-j as the source terminal based on the e-mail address of the transfer terminal 3-j. The alert e-mail requests the transfer terminal 3-j to replace the e-mail address of the transfer terminal 3-(j+1) as the transfer destination terminal with another e-mail address. The other e-mail address is of another of the transfer terminals 3-1 to 3-n other than the transfer terminals corresponding to the e-mail addresses registered on the field 55-3 of the transfer log database 55. Also, the alert e-mail requests the transfer the transfer terminal 3-j to re-transmit the advertisement e-mail 20 with the replaced e-mail address of the destination terminal. When the e-mail address of the transfer terminal 3-(j+1) is not coincident with any of the registered e-mail addresses, the counting section 46 refers to the field 55-4 to count up the count value to "j+1" by "1", when the count value is "j" of the field 55-4. The log recording section 47 registers "j+1" counted by the counting section 46 on the field 55-4 as the (j+1)-th transfer log. Also, the log recording section 47 stores the e-mail ID, the e-mail address of the transfer terminal 3-j as the source terminal, the e-mail address of the transfer terminal 3-(j+1) as the destination terminal, the transfer time showing the time when the advertisement e-mail 20 is received from the transfer terminal 3-j, and the destination location of the transfer person C-(j+1) of the transfer terminal 3-(j+1), in the fields 55-1, 55-2, 55-3, 55-5, and 55-6 as the (j+1)-th transfer log 6. The count value "j+1" shows the (j+1)-th transfer log. The transfer number of times "j+1" means the number of persons of "j+1" to whom the advertisement e-mail 20 is transferred.

A symbol is recorded in the field 55-7 by the condition determining section 48 to show that the transfer log having the fields 55-1 to 55-6 is logically deleted. The condition determining section 48 refers to the transfer constraint condition database 57 to determine whether the transfer constraint condition contained in the transmission condition is satisfied. As the result of the determination, when the transfer constraint condition is not satisfied, the alert transmitting section 49 refers to the transfer log database 55 to transmit an alert e-mail to the transfer terminal 3-j as the source terminal based on the e-mail address of the transfer terminal 3-j. The transfer constraint condition is the destination location of the transfer person 3-(j+1), or the attribute of the destination, e.g., the transfer person 3-(j+1). The attribute of the destination contains a sexuality, interest, occupation, single or married state, or age of the destination. These attribute items of the destination are registered on the transfer constraint condition database 57 and the service e-mail transmission condition database 58 as the previously determined data. Also, these attribute items are registered on the personal profile database 59.

FIG. 8 shows the transfer constraint condition database 57. The transfer constraint condition database 57 contains the fields 57-1 to 57-4. The service e-mail receiving section 42 receives and stores the service e-mail 10 in the e-mail database 54. The advertisement e-mail receiving section 44 receives the advertisement e-mail 20 and the condition e-mail containing the transmission condition of the service e-mail 10 and the transfer constraint condition of the advertisement e-mail 20, and stores in the e-mail database 54. Before the advertisement e-mail transmitting section 43 transmits the advertisement e-mail 20 to the transfer terminal 3-1, the e-mail ID is stored in the field 57-1 of the transfer constraint condition database 57. Also, the destination location, time limit and the above-mentioned attribute items as the transfer constraint condition are registered by the log recording section 47 in the fields 57-2, 57-3, and 57-4 of the transfer constraint condition database 57. A time limit as the transfer constraint condition is used as a monitor condition by the monitoring section 52 when the advertisement e-mail 20 is transferred. For example, "E-mail ID", "=Tokyo NOT: Hokkaido", "2002.2.8. 21:00", "=woman NOT: man &/or=single NOT: marriage &/or=movie preference NOT: video appreciation" are registered in the fields 57-1, 57-2, 57-3, and 57-4 as shown in FIG. 8. The fields 57-1, 57-2, 57-3, and 57-4 shown in FIG. 8 are not limited to them.

The transfer constraint condition database 57 is used by the condition determining section 48 and the alert transmitting section 49 when a determining process of the transfer constraint condition is carried out. In this embodiment, the destination location registered on the field 57-2 is "Tokyo". The condition determining section 48 refers to the field 57-2 and the field 55-6 of the transfer log database 55 and determines whether the destination location "Tokyo" as the transfer constraint condition is satisfied. When the transfer constraint condition is not satisfied, the alert transmitting section 49 refers to the field 55-2 of the transfer log database 55 and transmits the alert e-mail to the transfer terminal 3-j as the transfer source terminal based on the e-mail address of the transfer terminal 3-j. Also, in this embodiment, the transfer constraint condition registered on the field 57-4 is "woman" as the sexuality of the destination, "single" as the single or married state of the destination, and "movie preference" as the interest of the destination. The condition determining section 48 refers to the field 57-4, the field 55-3 of the personal profile database 59 and the transfer log database 55, and determines whether the sexuality of the destination is "woman", the single or married state of the destination "is single", the interest of the destination is the "movie fun" are satisfied as the transfer constraint condition. When any of the sexuality of the destination of "woman", the interest of the destination of "movie preference", and the single or married state of the destination of "single" is not satisfied, the alert transmitting section 49 refers to the field 55-2 of the transfer log database 55. Then, the alert transmitting section 49 transmits an alert e-mail to the transfer terminal 3-j as the transfer source terminal based on the e-mail address of the transfer terminal 3-j. Also, the previously determined time limit for the transfer of the advertisement e-mail 20 is registered on the field 57-3 and is "2002.8.8 21:00" in this embodiment. The service e-mail 10 is the guidance of an invitation ticket of the movie as shown in FIG. 11. For example, this movie is a love story for the single woman.

FIG. 9 shows the advertisement e-mail transmission condition database 58. The advertisement e-mail transmission condition database 58 includes fields 58-1 to 58-5. Before the advertisement e-mail transmitting section 43 transmits the advertisement e-mail 20 to the terminal 3-1, the log recording section 47 registers the transmission condition and the transfer constraint condition in the fields 58-1, 58-2, 58-3, 58-4 and 58-5 of the main mail transmission condition database 58. The predetermined number of the transfer persons is registered in the field 58-2. The e-mail ID, the transfer destination location, the predetermined time limit and the attribute of the destination, i.e., a sexuality, interest, occupation, single or married state, and age of the predetermined transfer destination are same as the transfer constraint condition stored in the database 57. For example, "Mail ID", "100", "=Tokyo NOT: Hokkaido", "2002.2.8 21:00", "=Woman NOT: Man &/or=Single NOT: Married &/or=Movie Fun NOT: Video Viewing" are registered previously in the fields 58-1, 58-2, 58-3, 58-4 and 58-5 shown in FIG. 9. The fields 58-1, 58-2, 58-3, 58-4 and 58-5 shown in FIG. 9 are not limited to them.

The service e-mail transmission condition database 58 is used by the service e-mail transmitting section 42, the condition determining section 48, the consolation e-mail transmitting section 50 and the timer monitoring section 52, when the transfer constraint condition is satisfied as the result of the execution of a transfer constraint condition determining process. The timer section 51 has a function of a clock that measures the time. In this embodiment, a predetermined time limit registered in the field 58-4 is "2002.2.8 21:00" similar to a field 57-3. The timer monitoring section 52 refers to the field 58-4 and the field 55-5 of the transfer log database 55, and thereby checks whether or not the predetermined time limit "2002.2.8 21:00" as the transmission condition is satisfied (whether or not the time measured by the timer section 51 as a monitor condition passed the predetermined time "2002.2.8 21:00". If the transmission condition is not satisfied, namely if the monitor condition is satisfied after the elapse of the predetermined time "2002.2.8 21:00", the consolation e-mail transmitting section 50 refers to the field 55-3 of the transfer log database 55. Then, the consolation e-mail transmitting section 50 transmits a consolation e-mail to the terminals 3-1 to 3-j and the client terminal 1 to indicate the dissatisfaction with the transmission condition of the service e-mail 10. In case of the transmission of the consolation e-mail, the service e-mail transmitting section 42 does not transmit the service e-mail 10, since the transmission condition of the service e-mail 10 is not satisfied.

Also, in this embodiment, the predetermined number of the transfer persons registered in the field 58-2 is "100 Persons". If the predetermined time limit "2002.2.8 21:00" is not passed and the monitor condition is not satisfied, the condition determining section 48 refers to the field 58-2 and the field 55-4 of the transfer log database 55, and thereby checks whether or not the number of the predetermined transfer persons "100 Persons" as the transmission condition is satisfied. If the predetermined number of the transfer persons "100 Persons" is not satisfied, the advertisement e-mail transmitting section 43 refers to the field 55-3 of the transfer log database 55 and transmits the advertisement e-mail 20 to the terminal 3-(j+1) as the transfer destination terminal. On the other hand, if the predetermined number of the transfer persons "100 Persons" is satisfied, the service e-mail transmitting section 41 refers to the field 55-3 of the transfer log database 55. Then, the advertisement e-mail transmitting section 43 transmits the advertisement e-mail 20 to the terminal 3-(j+1) as the transfer destination terminal to notify the fact of the 100-th person. Then, the service e-mail transmitting section 41 transmits the service e-mail 10 stored in the e-mail database 54 to the transfer terminals 3-1 to 3-(j+1) in accordance with the e-mail addresses of the terminals 3-1 to 3-(j+1).

Also, in this embodiment, the transfer destination location registered in the field 58-3 is "Tokyo" similar to the field 57-2. Also, in this embodiment, the attribute items of the destination as the transfer constraint condition is "Woman", "Single", and "Movie Fun" in the field 58-5, similarly to the field 57-4.

FIG. 10 shows the personal profile database 59. The personal profile database 59 includes fields 59-1 to 59-8. In the personal profile database 59, data of the client A are registered in the field 59-1, 59-2, 59-3, 59-4, 59-5, 59-6, 59-7 and 59-8. The data of the client A contains the e-mail address of the client terminal 1, and a telephone number and name of the client a. Also, the data of the client A contains "Man" as sexuality, "Movie" as interest, "Office Worker (ABC Research Company" as occupation, "Married" as the single or married state and "45" as age of the client A. Also, in the personal profile database 59, the data of the advertiser B are registered in the field 59-1, 59-2, 59-3, 59-4, 59-5, 59-6, 59-7 and 59-8. The data of the advertiser B contains an e-mail address of the advertiser terminal 2, a telephone number of the advertiser B, and a name of the advertiser B. In addition, the data of the advertiser B contains "Man" as the sexuality, "Movie" as the interest, "Office Worker (DEF Co., Ltd.)" as the occupation, "Married" as the single or married state and "39" as the age of the advertiser B. Also, in the personal profile database 59, data of many transfer persons are registered in the field 59-1, 59-2, 59-3, 59-4, 59-5, 59-6, 59-7 and 59-8. For example, the data of the transfer persons contain e-mail addresses of the transfer terminals 3-1 to 3-n, telephone numbers of the transfer persons C-1 to C-n, and names of the transfer persons C-1 to C-n. Also, the data of the transfer persons contain sexualities, interests, occupations, the single or married state, and the ages of the transfer persons C-1 to C-n.

For example, "*@*", "090-**-", "Client Name", "Man", "Movie", "Office worker (ABC Research Company", "Married" and "45" are registered in the fields 59-1, 59-2, 59-3, 59-4, 59-5, 59-6, 59-7 and 59-8 shown in FIG. 10. Also, "x@x", "090-xx-xx", "Sponsor Name", "Man", "Movie", "Office Worker (DEF Co., Ltd.", "Married" and "39" are registered in the fields 59-1, 59-2, 59-3, 59-4, 59-5, 59-6, 59-7 and 59-8. Also, "EEE@EEE", "090-1111-1111", "FF FF (Name of Transfer Person)", "Man", "Video Viewing", "Worker", "Single" and "27" are registered in the fields 59-1, 59-2, 59-3, 59-4, 59-5, 59-6, 59-7 and 59-8. Also, "xxx@xxx", "090-2222-2222", "GG GG (Name of Transfer Person)", "Woman", "Movie", "Single" and "23" are registered in the fields 59-1, 59-2, 59-3, 59-4, 59-5, 59-6, 59-7 and 59-8. The fields 59-1, 59-2, 59-3, 59-4, 59-5, 59-6, 59-7 and 59-8 shown in FIG. 10** are not limited to them.

The personal profile database 59 is used by the condition determining section 48 and the alert transmitter 49 together with the transfer constraint condition database 57 when the transfer constraint condition determining process is carried out. Also, the personal profile database 59 is used by the fee charging section 53 when a fee charging process is carried out. A provider D cooperates with the client A, the advertiser B and the transfer persons C-1 to C-n.

When the service e-mail transmitter 41 transmits the service e-mail 10, the fee charging section 53 refers to the transfer log database 55 and determines a communication fee and usage fee of the service e-mail 10 and a communication fee and usage fee of the advertisement e-mail 20. The communication fee of the service e-mail 10 is charged when the service e-mail transmitting section 41 transmits the service e-mail 10 to the terminals 3-1 to 3-(j+1). The communication fee of the advertisement e-mail 20 is charged when the advertisement e-mail 20 is transferred among the terminals 3-1 to 3-(j+1). The fee charging section 53 transmits a service e-mail account notice e-mail for the communication fee and usage fee of the service e-mail 10 to the client terminal 1. Also, the fee charging section 53 transmits an advertisement e-mail account notice e-mail for the communication fee and usage fee of the advertisement e-mail 20 to the advertiser terminal 2. In addition, the fee charging section 53 transmits e-mail communication account notice e-mails for the communication fee and usage fee of the advertisement e-mail 20 to the transfer terminals, respectively. In this case, the fee charging section 53 registers a pair of the e-mail address of the client A and the service e-mail account notice in the account database 61, and registers the e-mail address of the advertiser B and the advertisement e-mail account notice e-mail in the accounting database 61.

Also, when the consolation e-mail transmitting section 50 transmits a consolation e-mail, the fee charging section 53 refers to the transfer log database 55 and determines the communication fee and usage fee of the consolation e-mail and the communication fee and usage fee of the advertisement e-mail 20. The communication fee of the consolation e-mail is charged when the consolation e-mail transmitting section 50 transmits the consolation e-mail to the terminals 3-1 to 3-(j+1) and the advertiser terminal 2. The communication fee of the advertisement e-mail 20 is charged when the advertisement e-mail transmitting section 43 transmits the advertisement e-mail 20 to the terminals 3-1 to 3-(j+1).

Also, it is supposed that the fee charging section 53 receives a fee change notice from any of the terminals, before transmitting the service e-mail account notice and the advertisement e-mail account notice to the output terminal. In this case, the fee charging section 53 refers to the transfer log database 55 and determines the communication fee and usage fee of the service e-mail 10, consolation e-mail and advertisement e-mail 20. Then, the fee charging section 53 registers the e-mail address of the terminal and the account notice e-mail as a set in the account database 61.

Consequently, according to the service e-mail providing system of the present invention, the account destination can be flexibly changed using the transfer log database 55 and the personal profile database 59.

Figure 12:
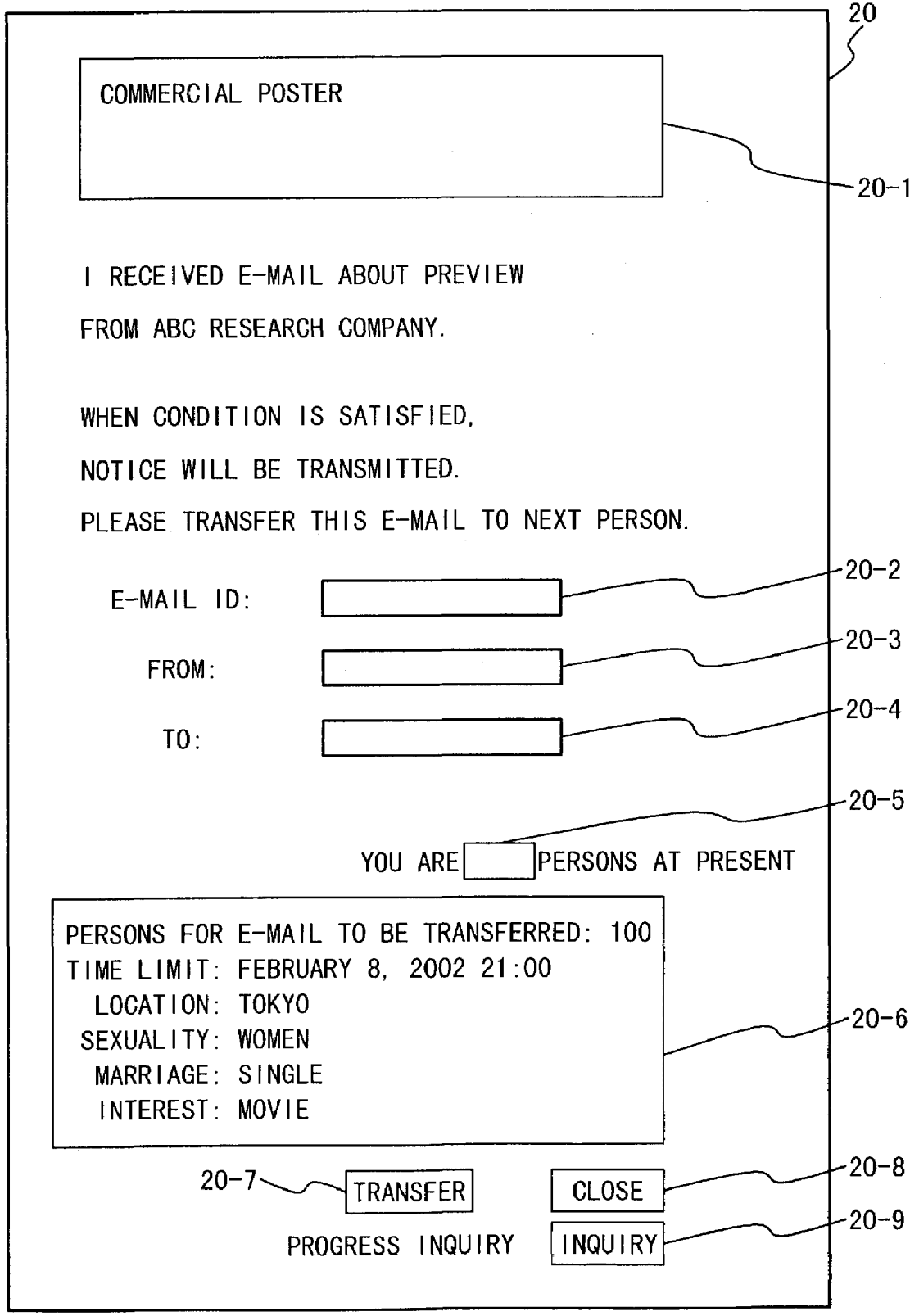
FIG. 12 is a diagram showing a notice e-mail in the first embodiment of the present invention.

FIG. 12 shows a format of the advertisement e-mail 20. The advertisement e-mail 20 includes fields 20-1 to 20-6 and buttons 20-7 to 20-9. Before the advertisement e-mail transmitting section 43 transmits the advertisement e-mail 20 to the terminal 3-1, the advertisement e-mail transmitting section 43 registers the advertisement data (advertisement, CM and poster) of the advertiser B in the field 20-1. The log recording section 47 registers the e-mail ID in the field 20-2, similar to the field 6-1 of the transfer log 6. The log recording section 47 registers a count value "1" in the field 20-5 by referring to the transfer log database 55. The log recording section 47 registers the transmission conditions ("100 Persons" as the number of the predetermined transfer persons, and "2002.2.8 21:00" as the predetermined time limit). Also, the log recording section 47 registers the transfer constraint condition ("Tokyo", "Woman", "Single", and "Movie Fun" as constraint condition times of the transfer destinations). The transmission condition and the transfer constraint condition are registered in the field 20-6 by referring to the service e-mail transmission condition database 58.

When the advertisement e-mail transmitting section 43 transmits the advertisement e-mail 20 to the terminal 3-j, the log recording section 47 registers a count value "j" in the field 20-5 by referring to the transfer log database 55. The receiving section 32 of the terminal 3-j receives the advertisement e-mail 20 from the advertisement e-mail transmitting section 43. The control section 33 of the terminal 3-j registers the advertisement e-mail 20 in the database 36. The display section 34 of the terminal 3-j displays the advertisement e-mail 20 on the display unit 37 automatically or in accordance with an operation of an input unit 39 by the transfer person C-j. At this time, the advertisement e-mail 20 is displayed on the display unit 37, containing the advertisement data, the e-mail ID, the count value "j", the transmission condition and the transfer constraint condition. However, the button 20-9 of the advertisement e-mail 20 is not displayed on the display unit 37 of the terminal 3-j. In accordance with the operation of the input unit 39 by the transfer person C-j, the transferring section 35 inputs the e-mail address of the terminal 3-j as the transfer source terminal, into the field 20-3, and inputs the e-mail address of the terminal 3-(j+1) as the transfer destination terminal, in to the field 20-4. Then, when the button 20-7 is pushed down, the transferring section 35 transfers the advertisement e-mail 20 through the e-mail server 4 to the terminal 3-(j+1). When the button 20-7 is pushed down, the e-mail address of the terminal 3-j inputted to the field 20-3 is registered in the field 6-2 of the transfer log 6, and the e-mail address of the terminal 3-(j+1) inputted to the field 20-4 is registered in the field 6-3 thereof. When the button 20-8 is pushed down by the operation of the input unit 39 by the transfer person C-j, the transferring section 35 closes the advertisement e-mail 20 displayed on the display unit 37 and the display of the advertisement e-mail 20 is ended.

After the transfer person C-j uses the terminal 3-j to transfer the advertisement e-mail 20, the transfer person C-j operates the input unit 39 to check the number of the transfer persons to which the advertisement e-mail 20 has been transferred. At this time, the transferring section 35 displays the advertisement e-mail 20 registered in the database 36 on the display unit 37 in accordance with the operation of the input unit 39 by the transfer person C-j. In this case, the button 20-7 is not displayed on the display unit 37. When the button 20-9 is pushed down through the operation of the input unit 39 by the transfer person C-j, the transferring section 35 transmits a progress inquiry notice to the e-mail server 4 to inquiry the count value registered in the transfer log database 55. This progress inquiry notice includes the e-mail address of the terminal 3-j inputted to the field 20-3. The advertisement e-mail receiving section 44 of the e-mail server 4 receives the progress inquiry notice from the transfer person C-j. Then, the log recording section 47 refers to the transfer log database 55 in accordance with the progress inquiry notice, and reads the count value corresponding to the transfer person C-j at the time of the reception of the progress inquiry notice. The advertisement e-mail transmitting section 43 transmits the count value to the terminal 3-j as the progress of the transfer of the advertisement e-mail 20 based on the e-mail address of the terminal 3-j.

The operation of the service e-mail providing system according to a first embodiment of the present invention will be described below. FIGS. 13 to 14A to 14C are flowcharts showing the operations of the service e-mail providing system according to the first embodiment.

As shown in FIG. 13, the advertiser terminal 2 transmits an e-mail 30 having advertisement data and the condition e-mail to the e-mail server 4 (Step S1). The advertisement e-mail receiving section 44 receives the advertisement e-mail 20 from the advertiser terminal 2 (Step S2) and registers in the e-mail database 54 (Step S3). The client terminal 1 transmits a service e-mail 10 to the e-mail server 4 (Step S4). The service e-mail receiving section 42 receives the service e-mail 10 from the client terminal 1 (Step S5) and stores in the e-mail database 54 (Step S6).

At the step S6, the advertisement e-mail transmitting section 43 generates the advertisement e-mail 20 containing the transmission condition of the service e-mail 10 and the transfer constraint condition in response to the reception of the service e-mail 10.

Figure 14A:
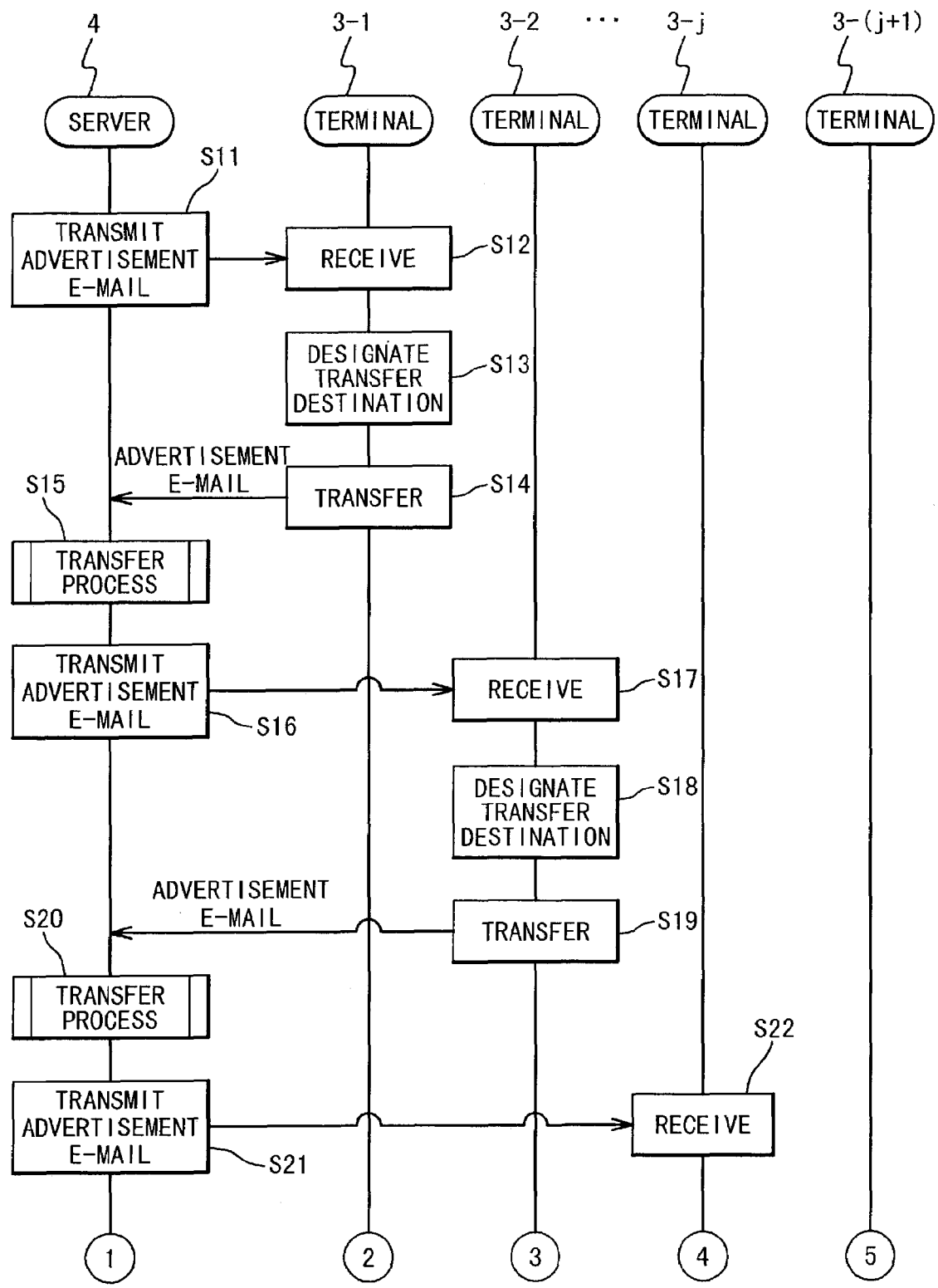
Figure 14C:
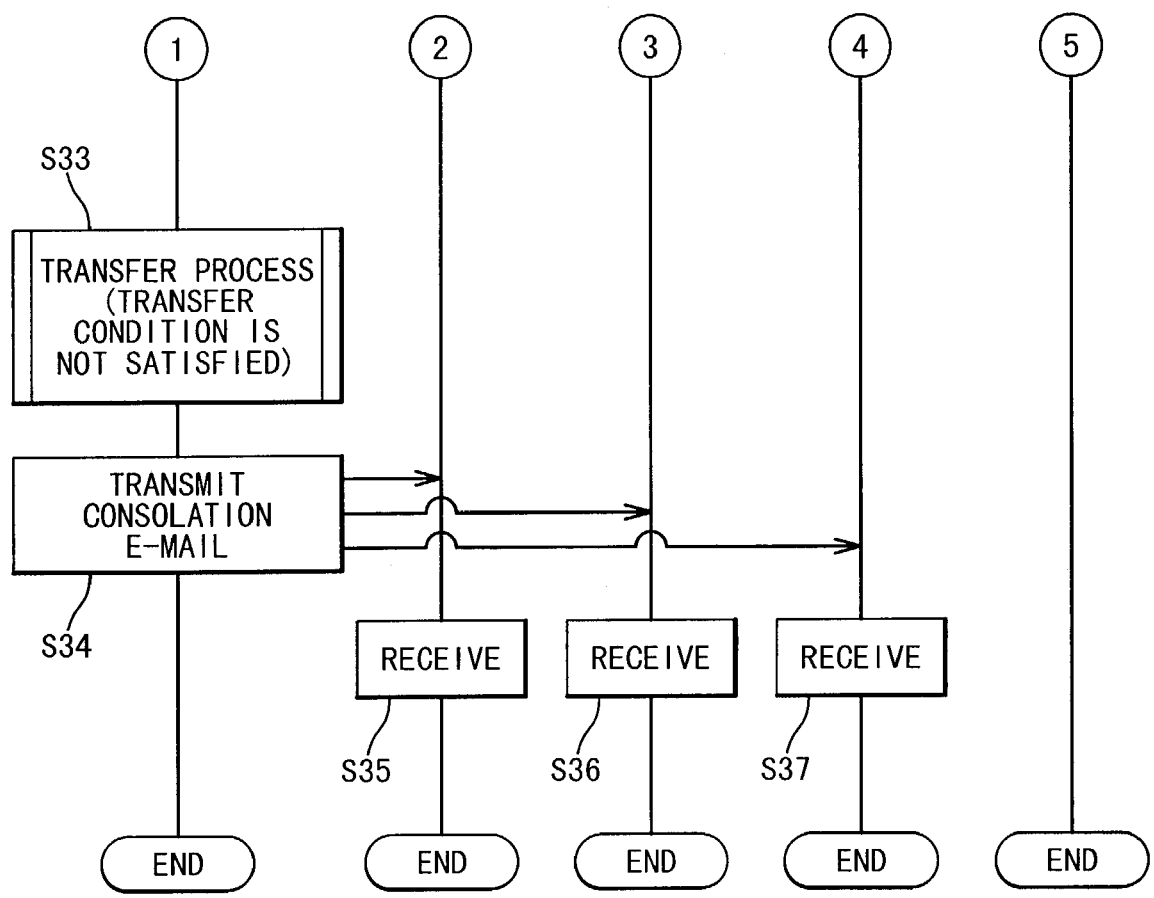

Next, as shown in FIG. 14A, it is supposed that the e-mail server 4 transmits the service e-mail 10 to the terminals 3-1 to 3-(j+1). In this case, the advertisement e-mail transmitting section 43 refers to the transfer destination e-mail address database 56 and transmits the advertisement e-mail 20 shown in FIG. 12 to the terminal 3-1 (Step S11). The advertisement e-mail has the transmission condition of the service e-mail 10, and the transfer constraint condition of the advertisement e-mail 20. The receiving section 32 of the terminal 3-1 receives the advertisement e-mail 20 from the advertisement e-mail transmitting section 43 of the e-mail server 4 (Step S12). The transferring section 35 inputs the e-mail address of the terminal 3-1 to the field 20-3 of the advertisement e-mail 20, in accordance with the operation of the input unit 39 by the transfer person C-1. Also, the transferring section 35 inputs the e-mail address of the terminal 3-2 to the field 20-4 as the transfer destination e-mail address (Step S13). Then, when the button 20-7 is pushed down, the transferring section 35 transfers the advertisement e-mail 20 through the e-mail server 4 to the terminal 3-2 (Step S14). At the step S14, when the advertisement e-mail 20 is received, the e-mail address of the terminal 3-1 inputted to the field 20-3 is registered in the field 6-2 of the transfer log 6, and the e-mail address of the terminal 3-2 inputted to the field 20-4 is registered in the field 6-3 thereof. The e-mail server 4 executes a transferring process, which will be described later, in accordance with the advertisement e-mail 20 from the terminal 3-1 (Step S15), and transmits the advertisement e-mail 20 to the terminal 3-2 (Step S16).

The receiving section 32 of the transfer terminal 3-2 receives the advertisement e-mail 20 from the advertisement e-mail transmitting section 43 of the e-mail server 4 (Step S17). The transferring section 35 of the transfer terminal 3-2 inputs the e-mail address of the terminal 3-2 to the field 20-3 of the advertisement e-mail 20, in accordance with the operation of the input unit 39 by the transfer person C-2. Also, the transferring section 35 inputs the e-mail address of the terminal 3-j to the field 20-4 as the transfer destination e-mail address (Step S18). Then, when the button 20-7 is pushed down, it transfers the advertisement e-mail 20 through the e-mail server 4 to the terminal 3-j (Step S19). At the step S14, when the button 20-7 is pushed down, the e-mail address of the terminal 3-2 inputted to the field 20-3 is registered in the field 6-2 of the transfer log 6, and the e-mail address of the terminal 3-j inputted to the field 20-4 is registered in the field 6-3. The e-mail server 4 executes a transferring process, which will be described later, in accordance with the advertisement e-mail 20 from the terminal 3-2 (Step S20), and transmits the advertisement e-mail 20 to the terminal 3-j (Step S21). The receiving section 32 of the terminal 3-j receives the advertisement e-mail 20 from the advertisement e-mail transmitting section 43 (Step S32).

As shown in FIG. 15, the transferring section 35 of the terminal 3-j inputs the e-mail address of the terminal 3-j to the field 20-3 of the advertisement e-mail 20, in accordance with the operation of the input unit 39 by the transfer person C-j. Also, the transferring section 35 inputs the e-mail address of the terminal 3-(j+1) to the field 20-4 as the transfer destination e-mail address (Step S23). Then, when the button 20-7 is pushed down, the transferring section 35 transfers the advertisement e-mail 20 through the e-mail server 4 to the terminal 3-(j+1) (Step S24). At the step S24, when the button 20-7 is pushed down, the e-mail address of the terminal 3-j inputted to the field 20-3 is registered in the field 6-2 of the transfer log 6, and the e-mail address of the terminal 3-(j+1) inputted to the field 20-4 is registered in the field 6-3 thereof. The e-mail server 4 executes the transferring process, which will be described later, in accordance with the advertisement e-mail 20 from the terminal 3-j (Step S25). When the transmission condition is satisfied, the e-mail server 4 transmits the advertisement e-mail 20 to the terminal 3-(j+1) to notify the satisfaction with the transmission condition (Step S26). The receiving section of the terminal 3-(j+1) receives the advertisement e-mail 20 from the advertisement e-mail transmitting section 43 of the e-mail server 4 (Step S27). Also, when the transmission condition is satisfied (n=j+1), the e-mail server 4 transmits the service e-mail 10 stored in the e-mail database 54 to the terminals 3-1 to 3-(j+1) in accordance with the e-mail addresses of the terminals 3-1 to 3-(j+1) (Step S28). The receiving sections 32 of the terminals 3-1 to 3-(j+1) receive the service e-mail 10 from the e-mail server 4 (Step S29, S30, S31 and S32).

On the other hand, in the service e-mail providing system according to the first embodiment, the steps S11 to S22 shown in FIG. 14A are carried out, the e-mail server 4 executes the transferring process in accordance with the monitor condition as shown in FIG. 16 (Step S33). The e-mail server 4 transmits the consolation e-mail to the terminals 3-1 to 3-j, when the transmission condition is not satisfied (Step S34). Although not shown, at the step S34, the e-mail server 4 also transmits the consolation e-mail to the client terminal 1 when the transmission condition is not satisfied. The receiving sections 32 of the terminals 3-1 to 3-j receive the consolation e-mail from the e-mail server 4 (Steps S35, S36 and S37). Although not shown, the client terminal 1 receives the consolation e-mail.

FIGS. 15A to 15D are flowcharts showing the operation of the transferring process in the e-mail server 4 of the service e-mail providing system according to the first embodiment.

Figure 15A:
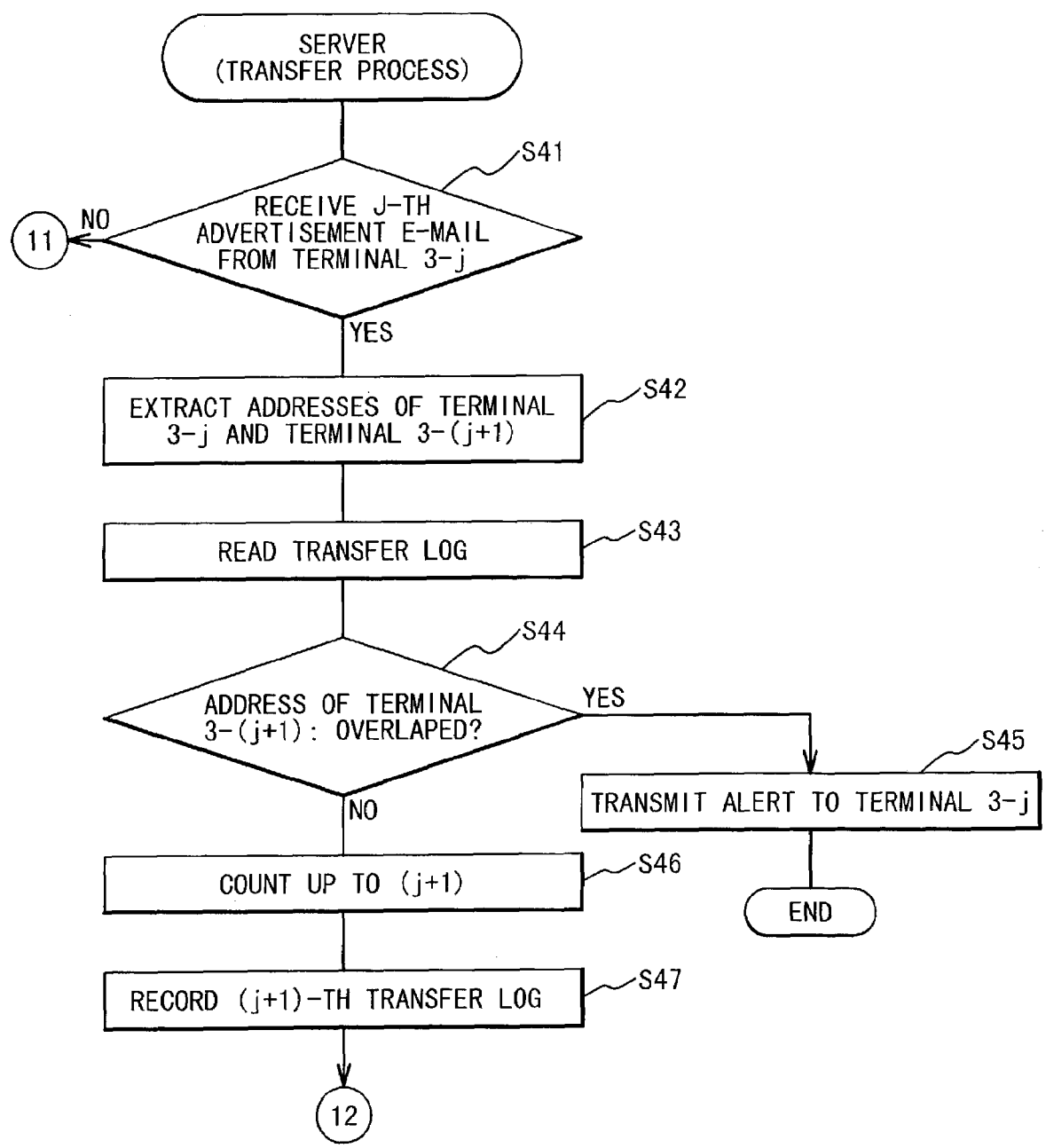
FIGS. 15A to 15D are flow charts showing the operation of a transfer process in the mail server of the e-mail transfer system according to the first embodiment of the present invention.

As shown in FIG. 15A, when the advertisement e-mail receiving section 44 receives the j-th advertisement e-mail 20 from the terminal 3-j (Step S41-YES), the From-To e-mail address extracting section 45 extracts the e-mail addresses of the terminal 3-(j+1) and the terminal 3-j from the j-th advertisement e-mail 20 (Step S42). The log recording section 47 reads the e-mail ID, the e-mail address of the terminal 3-j as the transfer source terminal, the e-mail address of the terminal 3-(j+1) as the transfer destination terminal, the transfer time and the transfer destination location, as the transfer log 6 of the j-th advertisement e-mail 20 (Step S43). The condition determining section 48 refers to the transfer log database 55 and checks whether or not the e-mail address of the terminal 3-(j+1) as the transfer destination terminal overlaps with any of the e-mail addresses registered in the field 55-3 (Step S44). For example, if the e-mail address of the terminal 3(j+1) overlaps with the e-mail address of the terminal 3-1 (Step S44-YES), the alert transmitting section 49 refers to the transfer log database 55 and transmits the alert to the terminal 3-j in accordance with the e-mail address of the terminal 3-j by an e-mail (Step S45). On the other hand, if the e-mail address of the terminal 3-(j+1) of the transfer destination terminal does not overlap (Step S44-NO), the counting section 46 refers to the field 55-4. If the count value is "j", the counting section 46 counts up by "1" (Step S46). The log recording section 47 registers a data set as the (j+1)-th transfer log in the fields 55-1 to 55-6 of the transfer log database 55 (Step S47). The data set includes the e-mail ID, the e-mail address of the terminal 3-j of the transfer source terminal, the e-mail address of the terminal 3-(j+1) of the transfer destination terminal, "j+1" counted by the counting section 46, the transfer time indicative of the time when the advertisement e-mail 20 is received from the terminal 3-j, and the transfer destination location to indicate the location of the transfer person C-(j+1) of the terminal 3-(j+1).

Figure 15B:
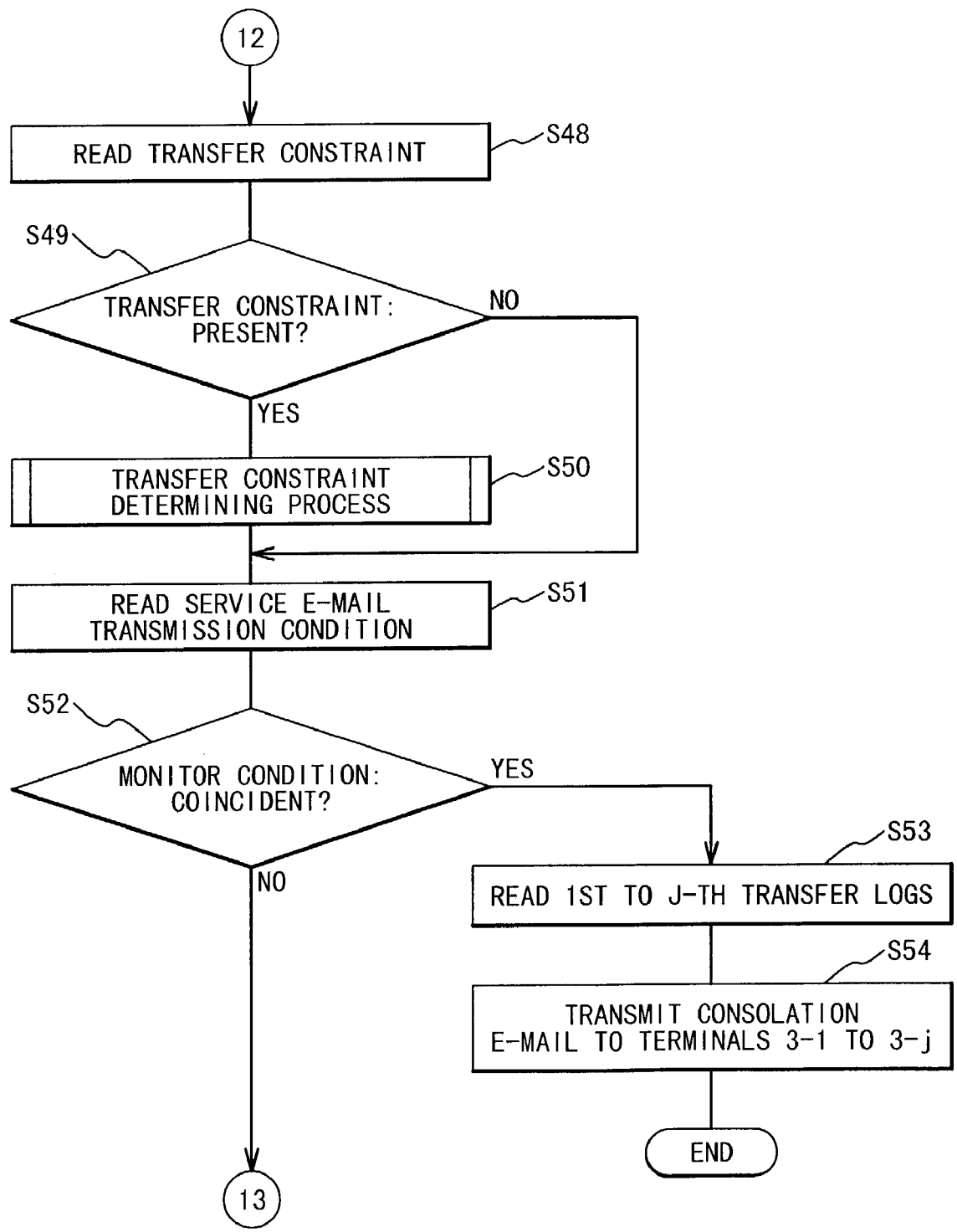

As shown in FIG. 15B, the condition determining section 48 refers to the transfer constraint condition database 57 and reads the transfer constraint condition (Step S48). If there is the transfer constraint condition in the transfer constraint condition database 57 (Step S49-YES), the service e-mail providing system according to the first embodiment executes the transfer constraint condition determining process (Step S50). The condition determining section 48 refers to the service e-mail transmission condition database 58 and reads the transmission condition or the monitor condition (Step S51). If there is not the transfer constraint condition in the transfer constraint condition database 57 (Step S49-NO), the condition determining section 48 executes the step S51. The timer monitoring section 52 checks whether or not the monitor condition read by the condition determining section 48 is satisfied or whether or not the time measured by the timer section 51 exceeds the predetermined time "2002.2.8 21:00" (Step S52). If the monitor condition is satisfied (Step 52-YES), the consolation e-mail transmitting section 50 refers to the transfer log database 55 and reads the first to j-th transfer logs (Step S53), and then transmits the consolation e-mail to the terminals 3-1 to 3-j to indicate the dissatisfaction with the transmission condition of the service e-mail 10 (Step S54). The satisfaction of the monitor condition implies the elapse of the predetermined time "2002.2.8 21:00" without the satisfaction with "100 Persons" as the number of the predetermined transfer persons (n=100) as the transmission condition. Also, although not shown, at the step S54, the consolation e-mail transmitting section 50 transmits the consolation e-mail to the client terminal 1.

Figure 15C:
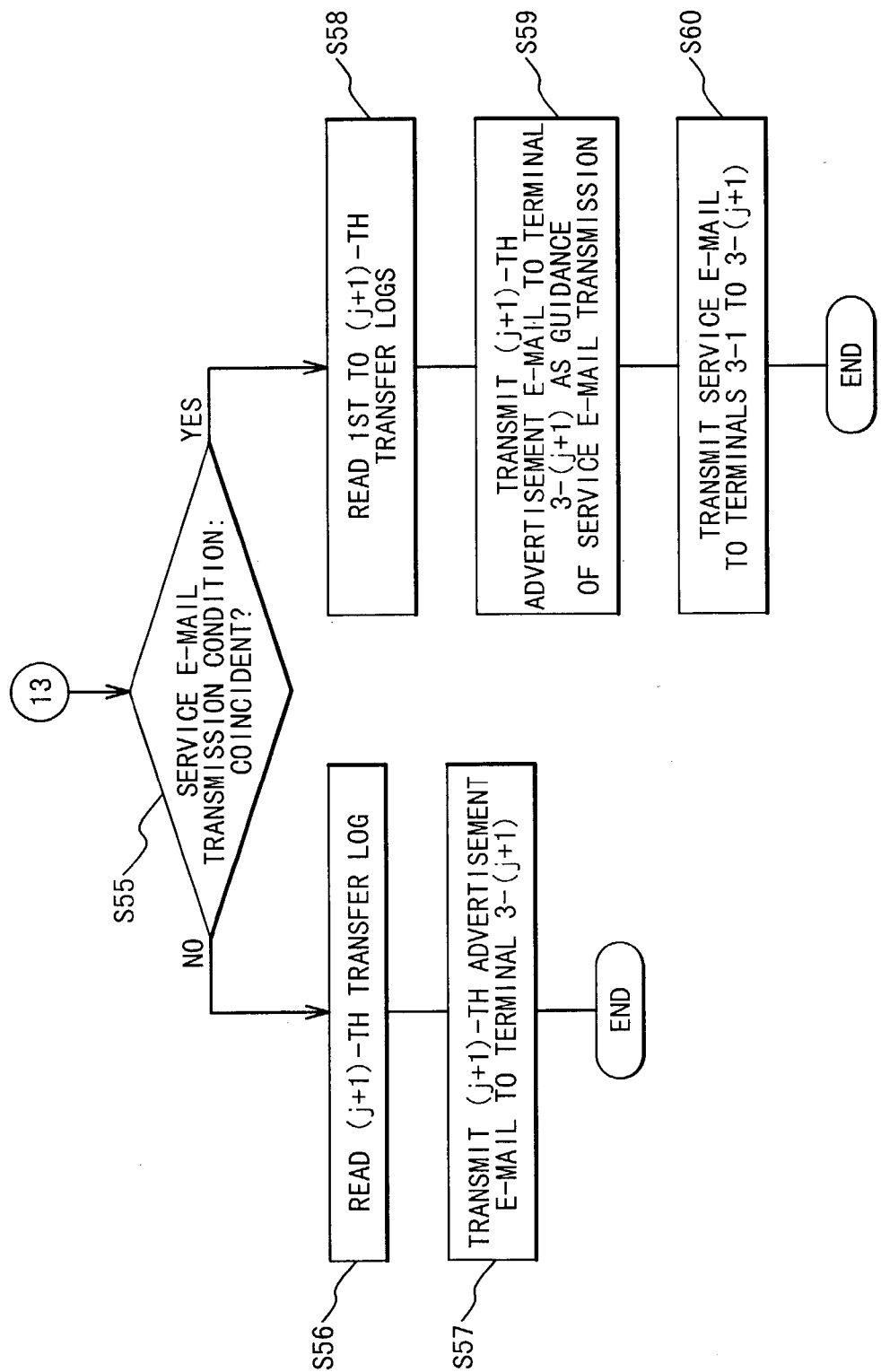

If the monitor condition is not satisfied (Step S52-NO), the condition determining section 48 refers to the transfer log database 55 and checks whether or not the transmission condition is satisfied, i.e., whether or not the transfer count "(j+1)" satisfies the predetermined transfer number n, as shown in FIG. 15C (Step S55). If the transmission condition is not satisfied (Step S55-NO), the advertisement e-mail transmitting section 43 refers to the transfer log database 55 and reads the (j+1)-th transfer log (Step S56), and then transmits the advertisement e-mail 20 to the terminal 3-(j+1) of the transfer destination terminal (Step S57). On the other hand, if the transmission condition is satisfied (Step S55-YES), the service e-mail transmitting section 43 refers to the transfer log database 55, and reads the first to (j+1)-th transfer logs (Step S58). Then, the service e-mail transmitting section 43 transmits the advertisement e-mail 20 to the terminal 3-(j+1) of the transfer destination terminal as the notice of the 100-th person, or the guidance of the service e-mail transmission (Step S59). Then, the service e-mail transmitting section 43 transmits the service e-mail 10 stored in the e-mail database 54 to the terminals 3-1 to 3-(j+1) in accordance with the e-mail addresses of the terminals 3-1 to 3-(j+1) (Step S60).

Figure 15D:
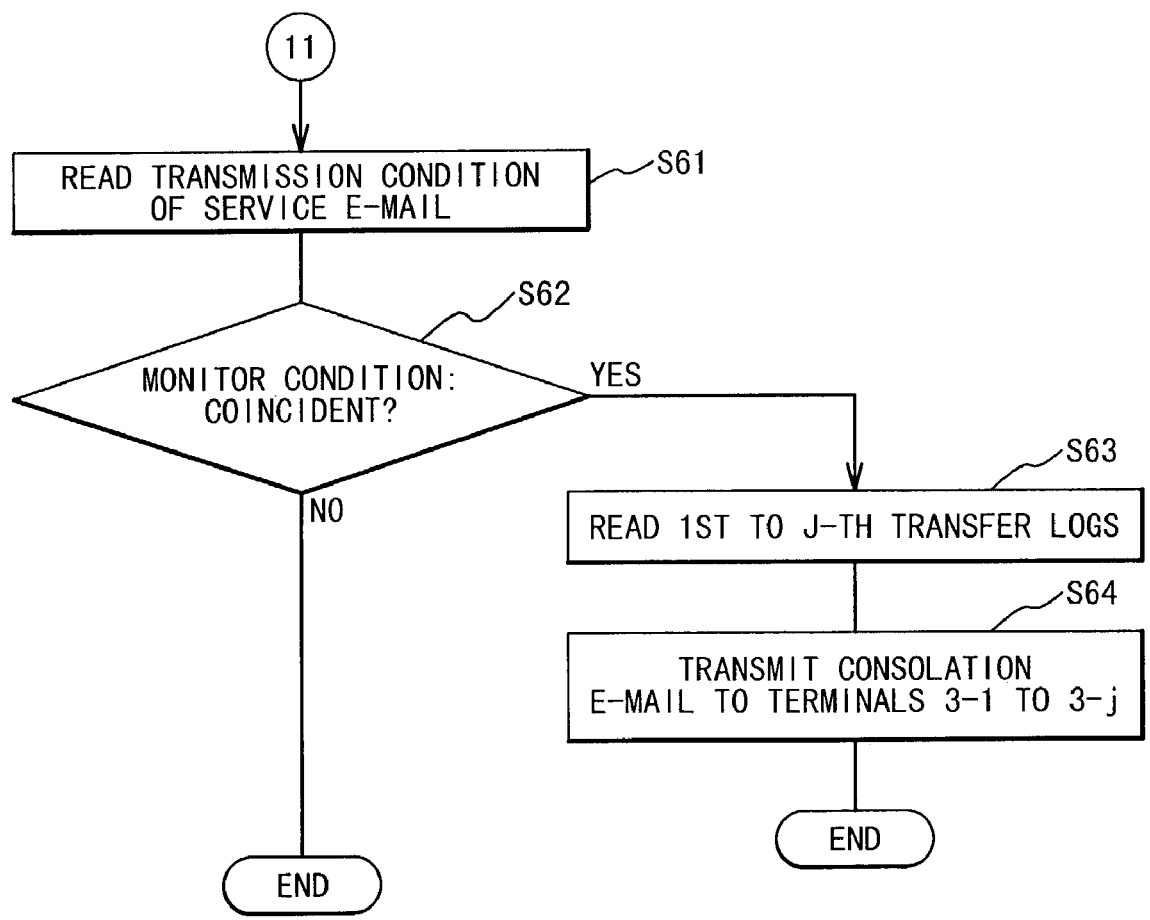

Also, as shown in FIG. 15D, if the advertisement e-mail receiving section 44 does not receive the j-th advertisement e-mail 20 from the terminal 3-j (Step S41-NO), the condition determining section 48 refers to the service e-mail transmission condition database 58 and reads the transmission condition or the monitor condition (Step S61). The timer monitoring section 52 checks whether or not the monitor condition read by the condition determining section 48 is satisfied, i.e., whether or not the time measured by the timer 51 exceeds the predetermined time "2002.2.8 21:00") (Step S62). If the monitor condition is satisfied through the elapse of the predetermined time "2002.2.8 21:00") (Step 62-YES), the consolation e-mail transmitting section 50 refers to the transfer log database 55 and reads the first to j-th transfer logs (Step S63). Then, the consolation e-mail transmitting section 50 transmits the consolation e-mail to the terminals 3-1 to 3-j to indicate the dissatisfaction with the transmission condition of the service e-mail 10 (Step S64). Also, although not shown, at the step S64, the consolation e-mail transmitting section 50 transmits the consolation e-mail to the client terminal 1.

Figure 16A:
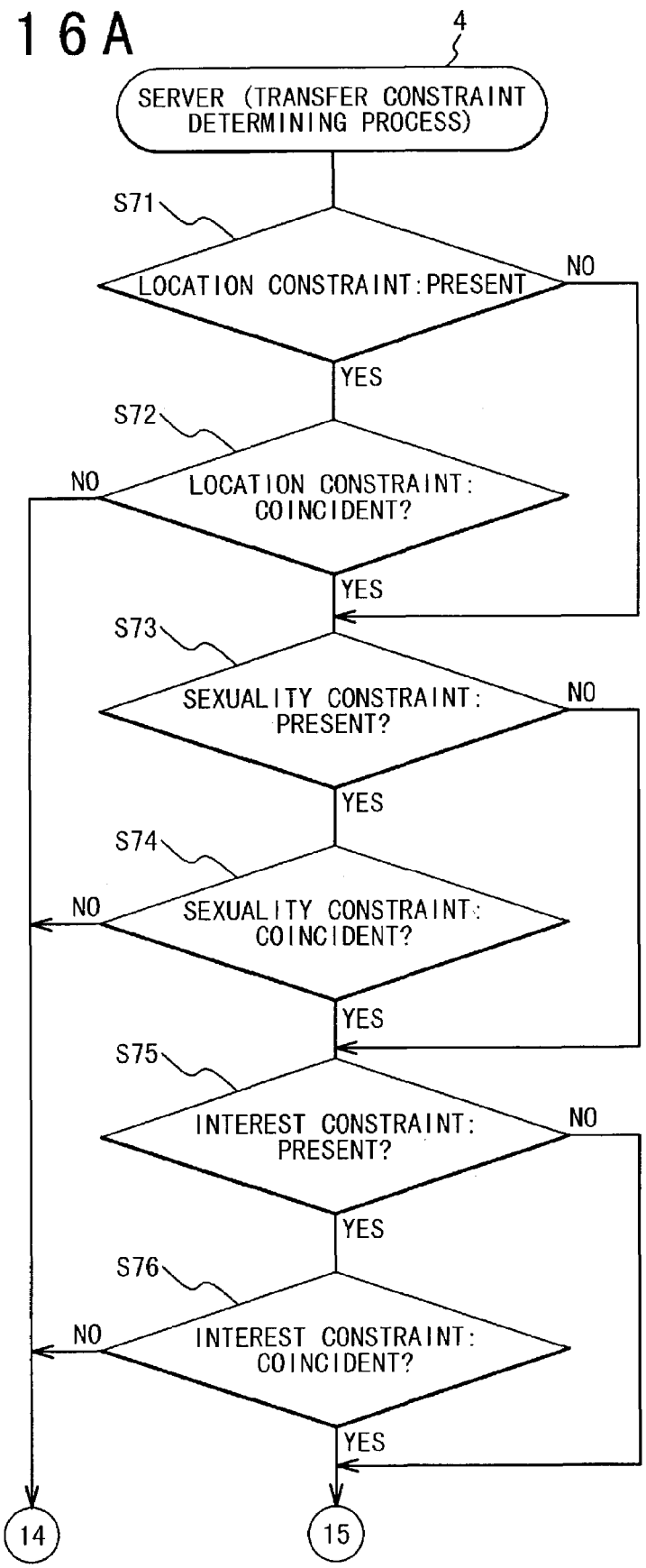
FIGS. 16A to 16C are flow charts showing the operation of a transfer constraint condition determining process in the mail server of the e-mail transfer system according to first embodiment of the present invention.
Figure 16B:
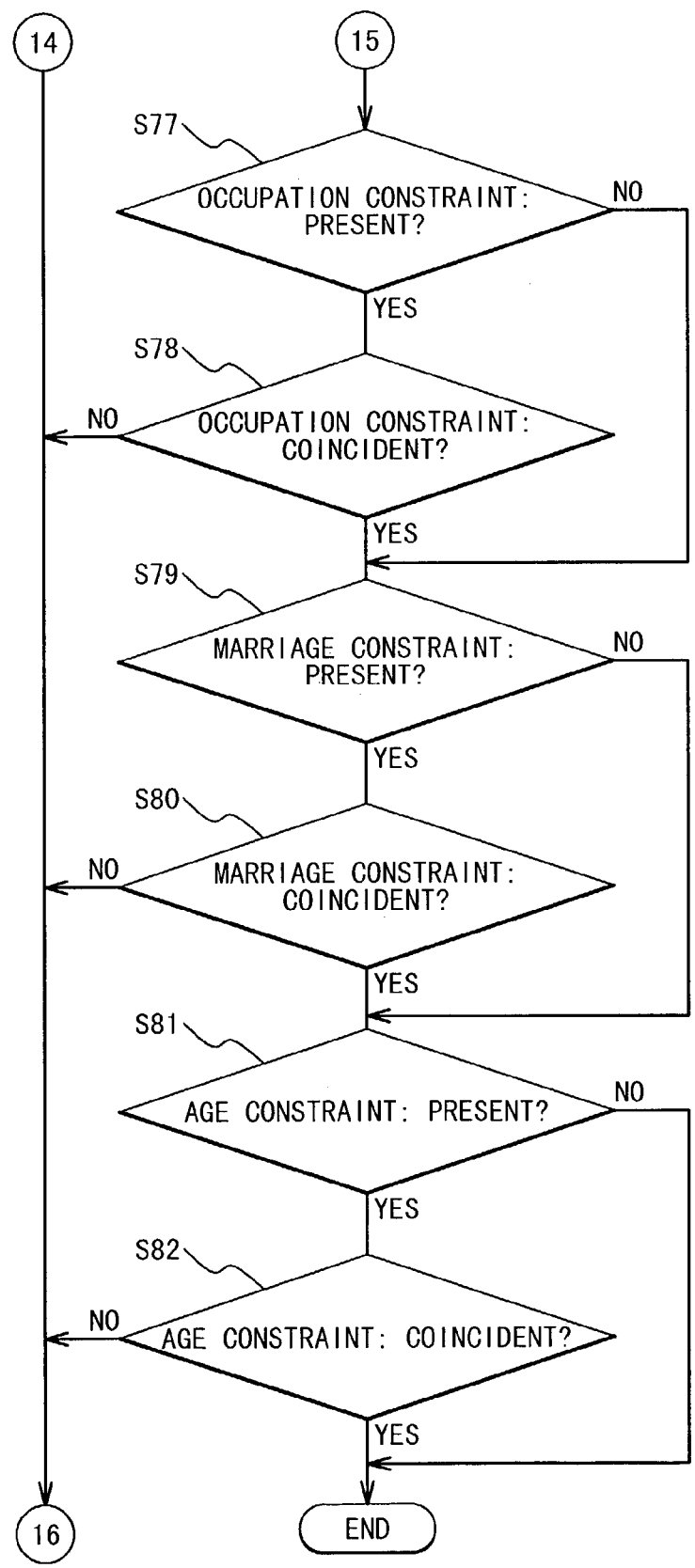
Figure 16C:
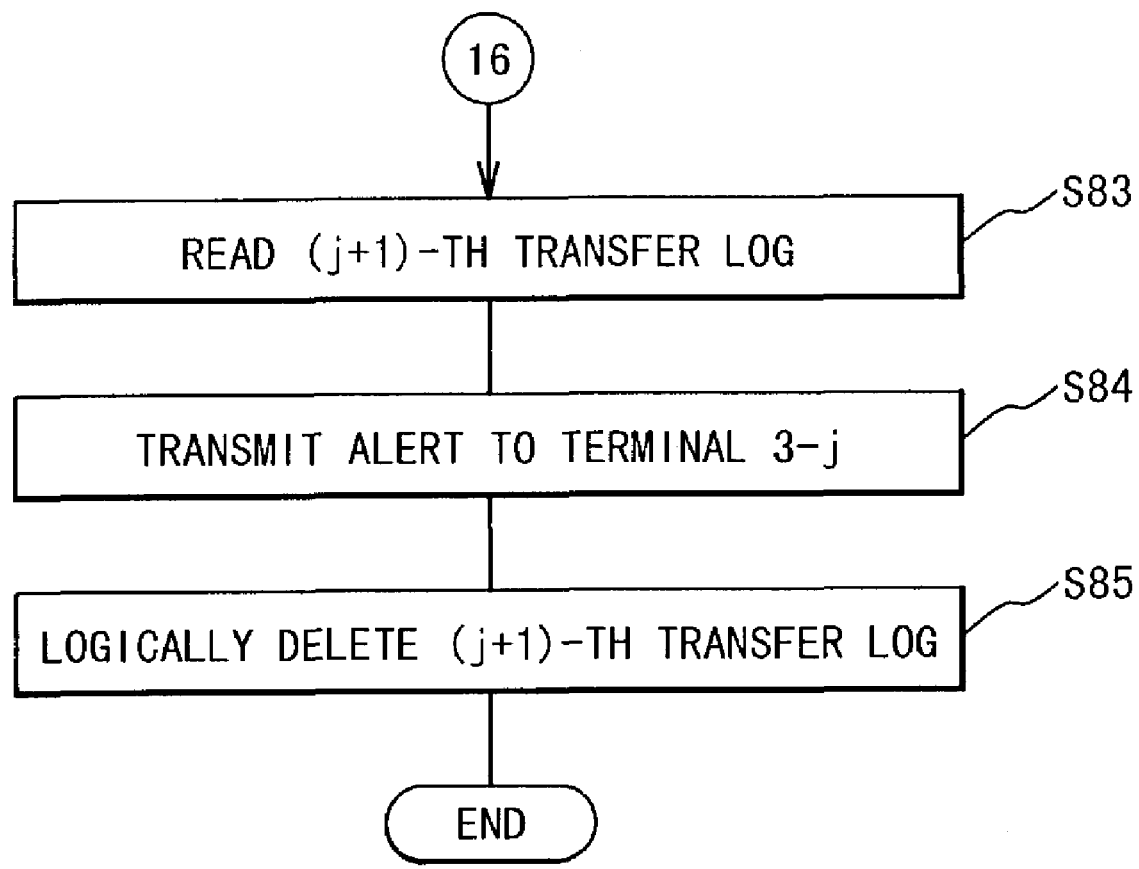

FIGS. 16A to 16C are flowcharts showing the operation of the transfer constraint condition determining process in the e-mail server 4 of the service e-mail providing system according to the first embodiment.

As shown in FIG. 21, if the predetermined transfer destination location is registered in the transfer constraint condition database 57 as the transfer constraint condition (Step S71-YES), the condition determining section 48 refers to the field 57-2 of the transfer constraint condition database 57 and the field 55-6 of the transfer log database 55. Then, the condition determining section 48 checks whether or not the transfer destination location is satisfied, i.e., whether or not the transfer destination location satisfies the predetermined transfer destination location (Step S72). It is supposed that the transfer destination location is satisfied (Step S72-YES) and the sexuality of the predetermined transfer destination as the transfer constraint condition is registered in the transfer constraint condition database 57 (Step S73-YES). In this case, the condition determining section 48 refers to the field 57-4 of the transfer constraint condition database 57 and the fields 59-1, 59-4 of the personal profile database 59 and the field 55-3 of the transfer log database 55. Then, the condition determining section 48 checks whether or not the sexuality of the transfer destination is satisfied, i.e., whether or not the sexuality of the transfer destination satisfies the sexuality of the predetermined transfer destination (Step S74). If the sexuality of the transfer destination is satisfied (Step S74-YES) and the interest of the predetermined transfer destination as the transfer constraint condition is registered in the transfer constraint condition database 57 (Step S75-YES), the condition determining section 48 refers to the field 57-4 of the transfer constraint condition database 57. In addition, the condition determining section 48 refers to the fields 59-1, 59-5 of the personal profile database 59 and the field 55-3 of the transfer log database 55, and checks whether or not the interest of the transfer destination is satisfied (Step S76).

If the interest of the transfer destination is satisfied (Step S76-YES) and the occupation of the predetermined transfer destination as the transfer constraint condition is registered in the transfer constraint condition database 57 (Step S77-YES), the condition determining section 48 refers to the field 57-4 of the transfer constraint condition database 57. In addition, the condition determining section 48 refers to the fields 59-1, 59-6 of the personal profile database 59 and the field 55-3 of the transfer log database 55. Then, the condition determining section 48 checks whether or not the occupation of the transfer destination is coincident, That is, the condition determining section 48 checks whether or not the occupation of the transfer destination satisfies the occupation of the predetermined transfer destination (Step S78). If the occupation of the transfer destination is satisfied (Step S78-YES) and the single or married state of the predetermined transfer destination as the transfer constraint condition is registered in the transfer constraint condition database 57 (Step S79-YES), the condition determining section 48 refers to the field 57-4 of the transfer constraint condition database 57. In addition, the condition determining section 48 refers to the fields 59-1, 59-7 of the personal profile database 59 and the field 55-3 of the transfer log database 55. Then, the condition determining section 48 checks whether or not the single or married state of the transfer destination is satisfied. That is, the condition determining section 48 checks whether the single or married state of the transfer destination satisfies the single or married state of the predetermined transfer destination (Step S80). If the single or married state of the transfer destination is satisfied (Step S80-YES) and the age of the predetermined transfer destination as the transfer constraint condition is registered in the transfer constraint condition database 57 (Step S81-YES), the condition determining section 48 refers to the field 57-4 of the transfer constraint condition database 57. In addition, and the fields 59-1, 59-8 of the personal profile database 59 and the field 55-3 of the transfer log database 55 and checks whether or not the age of the transfer destination is satisfied (whether or not the age of the transfer destination satisfies the age of the predetermined transfer destination (Step S82). If the age of the transfer destination is satisfied (Step S82-YES), the transfer constraint condition determining process is ended.

Also, if the transfer destination location, the sexuality of the transfer destination, the interest of the transfer destination, the occupation of the transfer destination, the single or married state of the transfer destination and the age of the transfer destination are not coincident with the predetermined transfer destination location, and the sexuality, interest, occupation, single or married state, and age of the predetermined transfer destination (Step S72-NO, Step S74-NO, Step S76-NO, Step S78-NO, Step S80-NO and Step S82-NO), the alert transmitting section 49 refers to the transfer log database 55, as shown in FIG. 16C. Then, the alert transmitting section 49 reads the (j+1)-th transfer log (Step S83) and then transmits the alert to the terminal 3-j as the transfer source terminal in accordance with the e-mail address of the terminal 3-j, by using the e-mail (Step S84). The condition determining section 48 registers the symbol indicating that the (j+1)-th transfer log registered in the fields 55-1 to 55-6 while being associated with the field 55-7 of the transfer log database 55 is logically deleted (Step S85).

Figure 17:
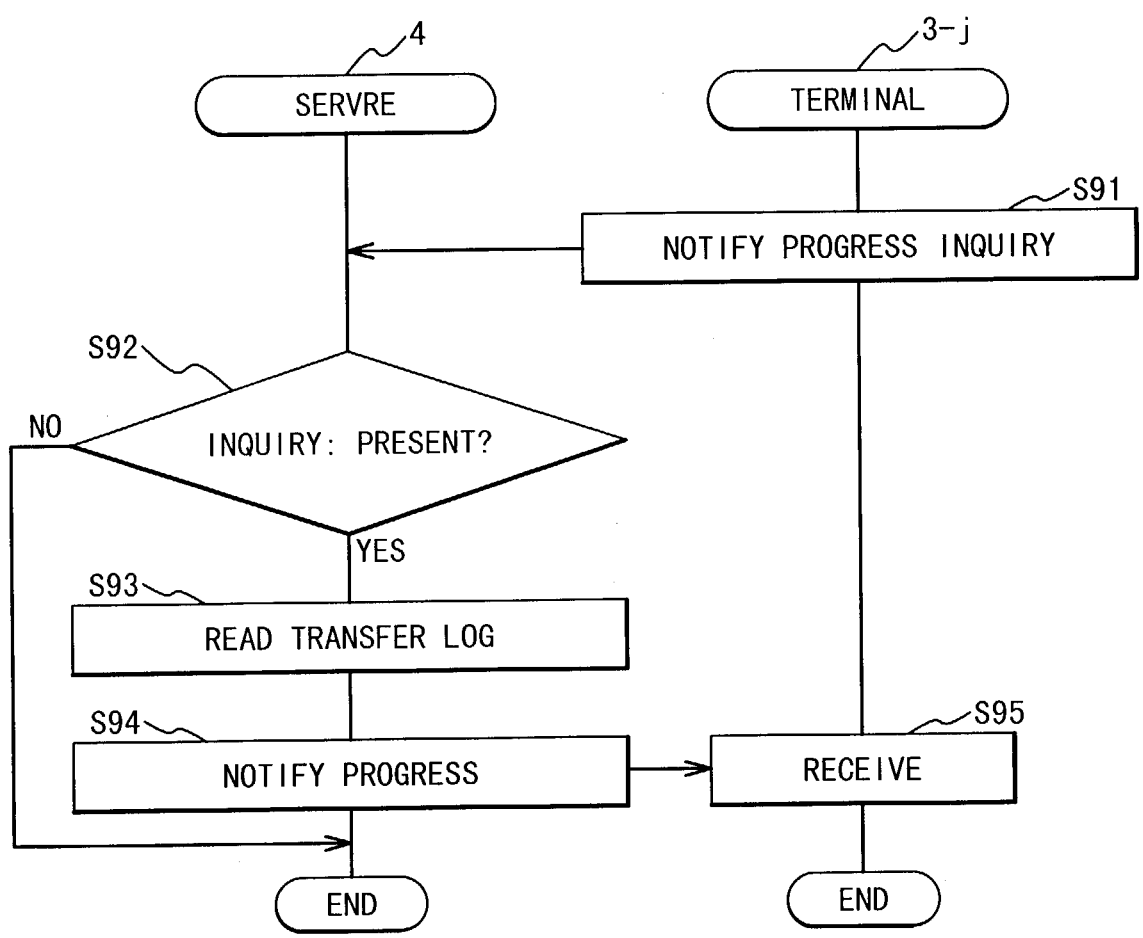
FIG. 17 is a flow chart showing the operation of a progress inquiry process in the e-mail transfer system according to first embodiment of the present invention.

Also, after the transfer person C-j uses the terminal 3-j to transfer the advertisement e-mail 20, the transfer person C-j operates the input unit 39 to check the number of the transfer persons to which the advertisement e-mail 20 is transferred. The transferring section 35 transmits to the e-mail server 4, the progress inquiry notice to inquire the count value registered in the transfer log database 55 in accordance with the operation of the input unit 39 by the transfer person C-j, as shown in FIG. 17. The advertisement e-mail receiving section 44 receives the progress inquiry notice from the transfer person C-j (Step S92). The log recording section 47 refers to the transfer log database 55 in accordance with the progress inquiry notice, and reads the count value as the transfer log registered in the transfer log database 55 at the time when the reception of the progress inquiry notice from the transfer person C-j (Step S93). The advertisement e-mail transmitting section 43 transmits the count value to the terminal 3-j in accordance with the e-mail address of the terminal 3-j, as the progress of the transfer of the advertisement e-mail 20, by using an e-mail (Step S94). The terminal 3-j receives the count value from the advertisement e-mail transmitting section 43 (Step S95).

Figure 18:
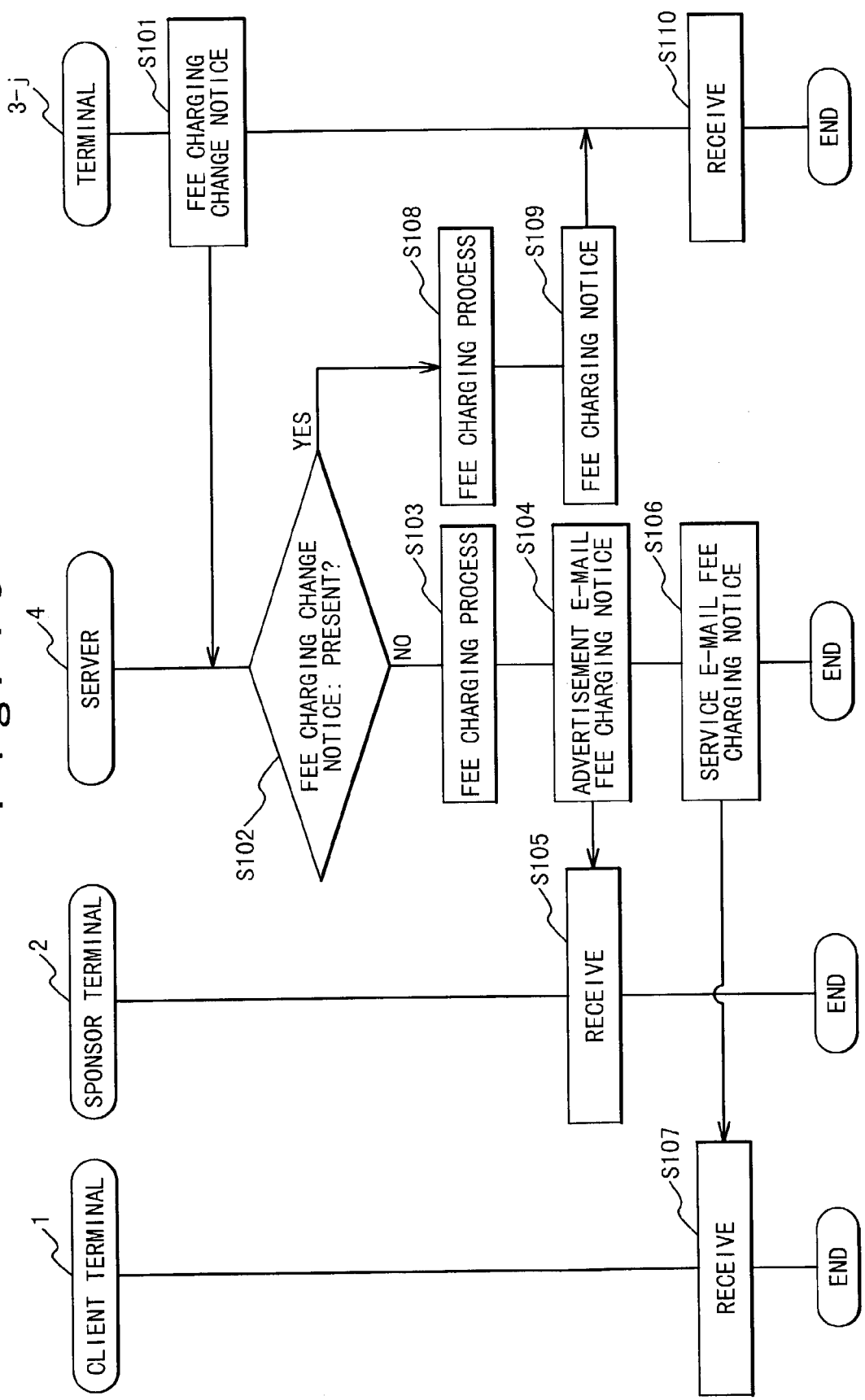
FIG. 18 is a flow chart showing the operation of a fee charging process in the e-mail transfer system according to first embodiment of the present invention.

Also, as shown in FIG. 18, the service e-mail providing system according to the first embodiment executes an accounting process. After the service e-mail transmitting section 41 of the e-mail server 4 transmits the service e-mail 10, the fee charging section 53 refers to the transfer log database 55 if the fee charging section 53 does not receive an account change notice from one terminal, e.g., the terminal 3-j at a step S101 (Step S102-NO). Then, the fee charging section 53 determines a communication fee and usage fee of the service e-mail 10 and a communication fee and usage fee of the advertisement e-mail 20. For example, if the account notice e-mails transmitted to the client terminal 1, the fee charging section 53 registers the e-mail address of the client A and a service e-mail account notice in the account database 61. The service e-mail account notice contains the communication fee and usage fee of the service e-mail 10. Also, the fee charging section 53 registers the e-mail address of the advertiser B and an advertisement e-mail account notice in the account database 61 (Step S103). The advertisement e-mail account notice contains the communication fee and usage fee of the advertisement e-mail 20.

The fee charging section 53 transmits the advertisement e-mail account notice to the advertiser terminal 2 for notification to the advertiser B (Step S104). The advertiser terminal 2 receives the advertisement e-mail account notice from the fee charging section 53 (Step S105). The fee charging section 53 transmits the service e-mail account notice to the client terminal 1 for notification to the client A (Step S106). The service e-mail account notice contains the communication fee and usage fee of the service e-mail 10. The client terminal 1 receives the service e-mail account notice from the fee charging section 53 (Step S107).

Similarly, after the consolation e-mail transmitting section 50 transmits the consolation e-mail, the fee charging section 53 refers to the transfer log database 55, if the fee charging section 53 does not receive the account change notice from the terminal 3-j at the step S101, for example (Step S102-NO). Then, the fee charging section 53 determines a communication fee and usage fee of the consolation e-mail and a communication fee and usage fee of the advertisement e-mail 20. Similar to the above-mentioned case, for example, if the account notice e-mails are transmitted to the client terminal 1 and the advertiser terminal 2, the fee charging section 53 registers the e-mail address of the client A and the service e-mail account notice in the account database 61. The service e-mail account notice contains the communication fee and usage fee of the consolation e-mail. Also, the fee charging section 53 correlates the e-mail address of the advertiser B and the advertisement e-mail account notice to charge the communication fee and usage fee of the advertisement e-mail 20, and registers in the account database 61 (Step S103).

The fee charging section 53 transmits the advertisement e-mail account notice to the advertiser terminal 2 for notification to the advertiser B (Step S104). The advertiser terminal 2 receives the advertisement e-mail account notice from the fee charging section 53 (Step S105). The fee charging section 53 transmits the service e-mail account notice to the client terminal 1) for notification to the client A (Step S106). The client terminal 1 receives the service e-mail account notice from the fee charging section 53 (Step S107).

After the fee charging section 53 executes the steps S103 to S107, the accounting process is not carried out even if the terminal 3-j transmits the account change notice (Step S101). On the other hand, the terminal 3-j transmits the account change notice (Step S101) before the fee charging section 53 executes the steps S103 to S107, the fee charging section 53 receives the account change notice from the terminal 3-j (Step S102-YES). The fee charging section 53 refers to the transfer log database 55 and determines the communication fee and usage fee of the service e-mail 10 or the consolation e-mail and the communication fee and usage fee of the advertisement e-mail 20. The fee charging section 53 registers the e-mail address of the transfer person C-j and a transfer person account notice in the account database 61 (Step S108). The transfer person account notice contains the communication fees and usage fees of the service e-mail 10 or the consolation e-mail and the advertisement e-mail 20. The fee charging section 53 transmits the transfer person account notice to the terminal 3-j for notification to the transfer person C-j (Step S109). The terminal 3-j receives the transfer person account notice from the fee charging section 53 (Step S110).

As described above, according to the service e-mail providing system of the present invention, the client A can distribute or deliver the data with regard to the service e-mail 10 by the advertisement e-mail 20 to the persons who are not registered in the client terminal 1, e.g., the transfer persons C-2 to C-n, in addition to the person registered in the client terminal 1, e.g., the transfer person C-1.

Also, according to the service e-mail providing system of the present invention, it is possible to preliminarily notify that the service e-mail 10 is transmitted to the transfer persons C-2 to C-n by the advertisement e-mail 20 (the advertisement e-mail 20 containing the advertisement data of the advertiser B). Thus, the advertiser B can distribute the advertisement data such as advertisement, and CM to the persons who are not registered in the advertiser terminal 2, e.g., the transfer persons C-2 to C-n, in addition to the person registered in the advertiser terminal 2, e.g., the transfer person C-1.

Also, according to the service e-mail providing system of the present invention, the account destination can be flexibly changed using the transfer log database 55 and the personal profile database 59.

(Second Embodiment)

Figure 19:
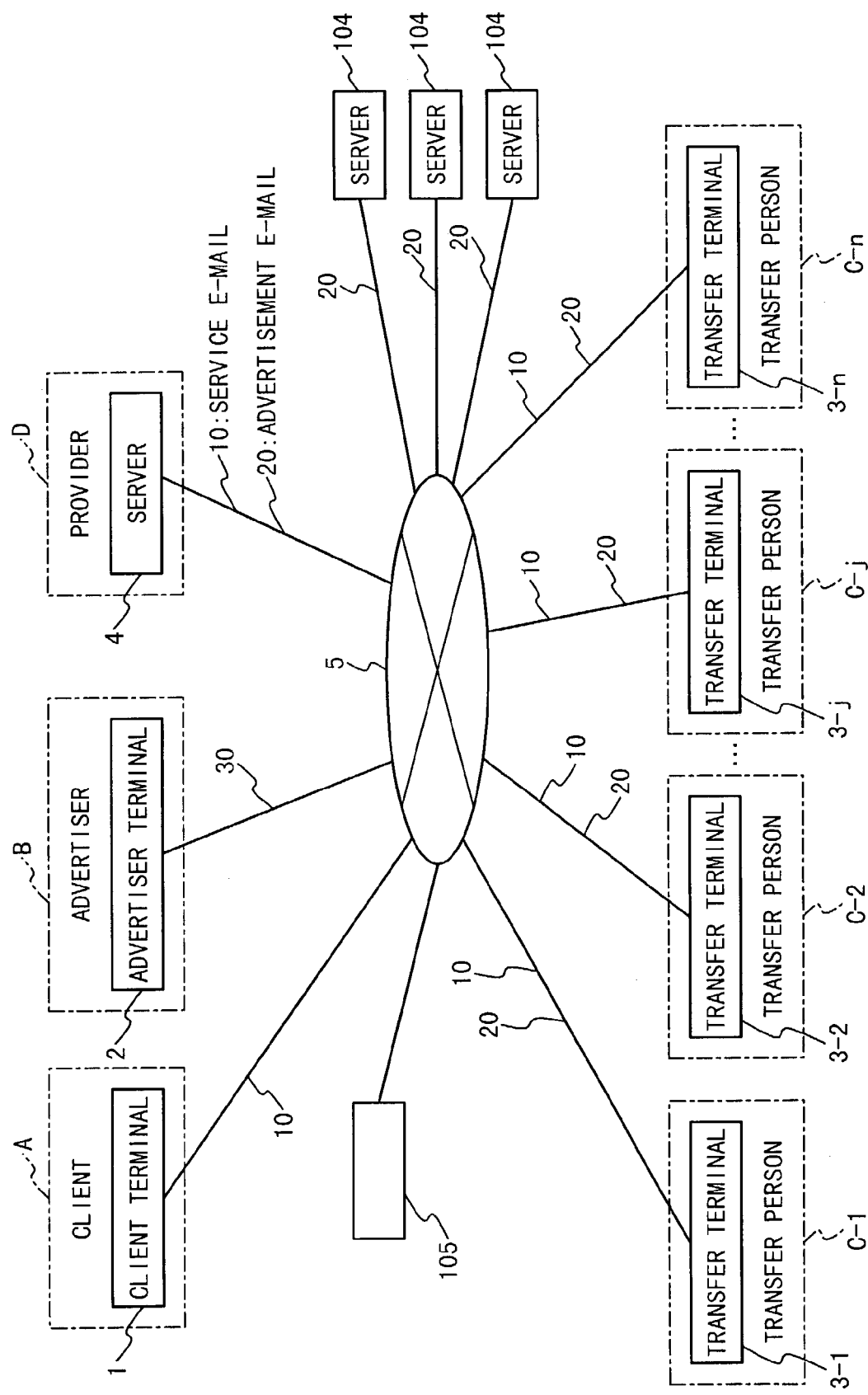
FIG. 19 is a block diagram showing the structure of the e-mail transfer system according to a second embodiment of the present invention.

FIG. 19 is a block diagram showing the configuration of the service e-mail providing system according to the second embodiment of the present invention. In the service e-mail providing system according to the second embodiment, a plurality of servers 104 are connected to the communication network 5 in the first embodiment. The terminal 3-j transmits a copy of the advertisement e-mail 20 to the e-mail server 4 when transferring the advertisement e-mail 20 through the server 104 to the terminal 3-(j+1). As the copy of the advertisement e-mail 20, CC (Carbon Copy) and BCC (Blind Carbon Copy) are exemplified. The copy of the advertisement e-mail 20 has the transfer log 6 described in the first embodiment. In the service e-mail providing system according to the second embodiment, ASP (Application Service Provider) is used as a location specifying section 105, in order to obtain this transfer log 6. Here, the transfer persons C-1, C-2 to C-n know the e-mail address of the e-mail server 4. Only the different points of the second embodiment from the first embodiment will be described below, and the description of points similar to the first embodiment are omitted.

The ASP is a service provider that provides an application software by which the e-mail server 4 acquires the transfer log 6 through the communication network 5. The provider contracts the client A, the advertiser B and the transfer persons C-1 and C-2 to C-n in advance. The application software is down loaded from the ASP to the client terminal 1, the advertiser terminal 2 and the terminals 3-1 and 3-2 to 3-n by the client A, the advertiser B and the transfer persons C-1 and C-2 to C-n. The service e-mail providing system according to the first embodiment can be achieved at a low price since the same application software is used by the client terminal 1, the advertiser terminal 2 and the terminals 3-1 and 3-2 to 3-n.

When transferring an advertisement e-mail from the terminal 3-j to the terminal 3-(j+1), the transfer person C-j uses the terminal 3-j to specify the e-mail address of the terminal 3-j as the transmission source e-mail address. In addition, the transfer person C-j specifies the e-mail address of the terminal 3-(j+1) as the transfer destination e-mail address and the e-mail address of the e-mail server 4 as the transfer destination, and then transmits the advertisement e-mail 20. The advertisement e-mail 20 is transferred from the terminal 3-j to the terminal 3-(j+1). The copy of the advertisement e-mail 20 is transferred through the ASP to the e-mail server 4. Consequently, according to the service e-mail providing system according to the second embodiment of the present invention, in addition to the effects of the first embodiment, the advertisement e-mail receiving section 44 of the e-mail server 4 can acquire the transfer log 6 from the copy of the advertisement e-mail 20 transferred through the ASP in case that the plurality of servers are connected to the communication network 5.

Figure 20:
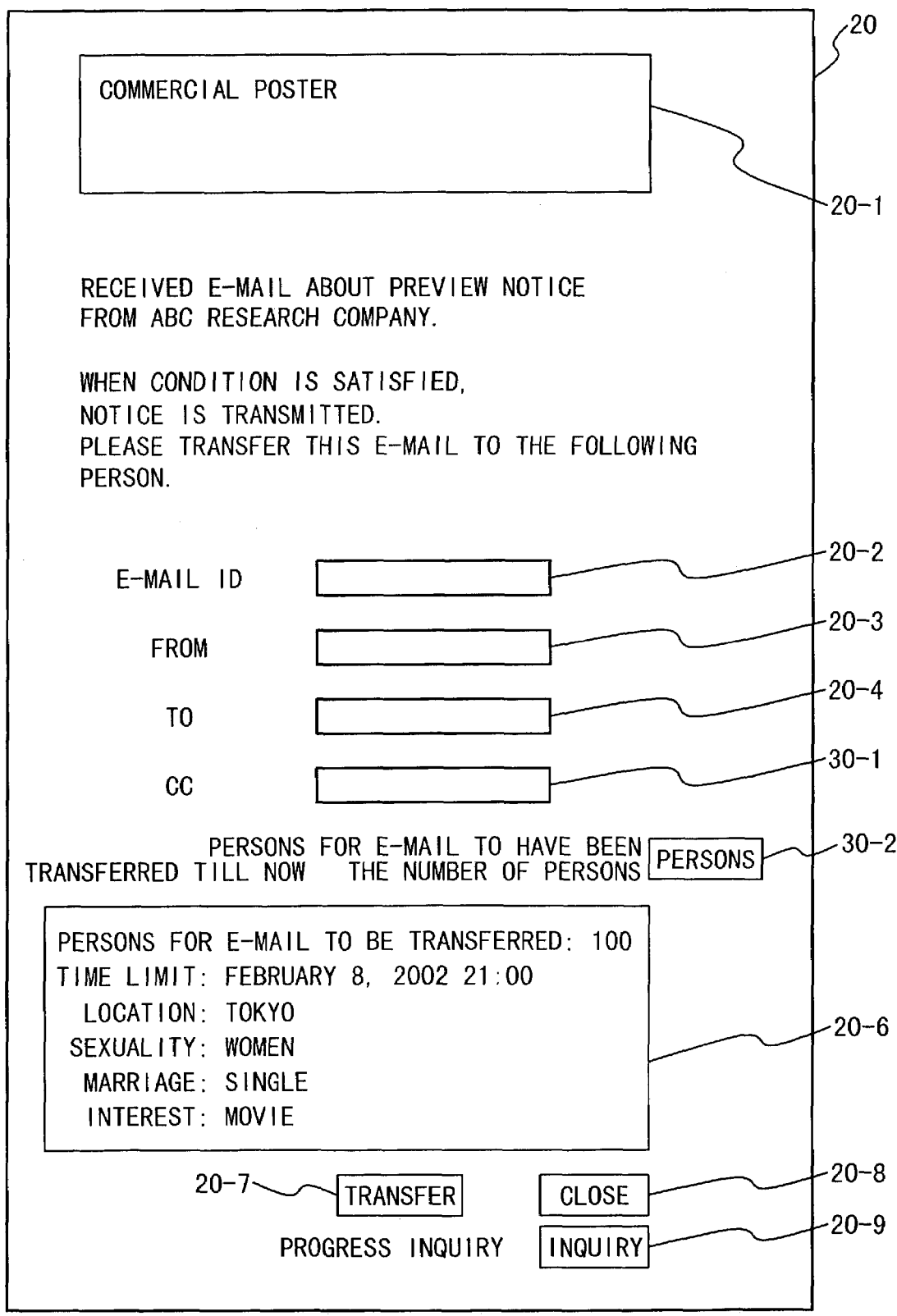
FIG. 20 is a diagram showing a notice e-mail in the second embodiment of the present invention.

FIG. 20 shows a format of the advertisement e-mail 20. The advertisement e-mail 20 does not have the field 20-5 described in the first embodiment, but further includes a field 30-1 and a button 30-2.

When the advertisement e-mail transmitting section 43 transmits the advertisement e-mail 20 to the terminal 3-j, the receiving section 32 of the terminal 3-j receives the advertisement e-mail 20 from the advertisement e-mail transmitting section 43. The control section 33 of the terminal 3-j registers the advertisement e-mail 20 in the database 36. The display section 34 of the terminal 3-j displays the advertisement e-mail 20 on the display unit 37 automatically or in accordance with the operation of the input unit 39 by the transfer person C-j. At this time, the button 20-9 is not displayed on the display unit 37. In accordance with the operation of the input unit 39 by the transfer person C-j, the transferring section 35 inputs the e-mail address of the terminal 3-j as the transmission source terminal to the field 20-3, the e-mail address of the terminal 3-(j+1) as the transfer destination terminal to the field 20-4, and the e-mail address of the e-mail server 4 to the field 30-1. The e-mail address of the e-mail server 4 may be inputted in advance in the field 30-1. When the button 20-7 is pushed down, the transferring section 35 transfers the advertisement e-mail through the server 104 to the terminal 3-(j+1), and transfers the copy of the advertisement e-mail 20 through the ASP to the e-mail server 4. When the button 20-7 is pushed down, the e-mail address of the terminal 3-j inputted to the field 20-3 is registered in the field 6-2 of the transfer log 6 associated with the advertisement e-mail 20, and the e-mail address of the terminal 3-(j+1) inputted to the field 20-4 is registered in the field 6-3. When the button 20-8 is pushed down by the operation of the input unit 39 by the transfer person C-j, the transferring section 35 closes the advertisement e-mail 20 displayed on the display unit 37, and the display of the advertisement e-mail 20 is ended.

Also, the transfer person C-j operates the input unit 39 to check the order of the transfer person C-j. The transferring section 35 displays on the display unit 37, the advertisement e-mail 20 registered in the database 36 in accordance with the operation of the input unit 39 by the transfer person C-j. When the button 30-2 is pushed down by the operation of the input unit 39 by the transfer person C-j, the transferring section 35 transmits a transfer person count inquiry notice to the e-mail server 4 to inquiry the count value registered in the transfer log database 55. This transfer person count inquiry notice includes the e-mail address of the terminal 3-j inputted to the field 20-3. The advertisement e-mail receiving section 44 of the e-mail server 4 receives the transfer person count inquiry notice from the transfer person C-j, and the log recording section 47 refers to the transfer log database 55 in accordance with the transfer person count inquiry notice. Then, the advertisement e-mail receiving section 44 reads the count value at the time of the reception of the transfer person number inquiry notice from the transfer person C-j. The advertisement e-mail transmitting section 43 transmits the read out count value to the terminal 3-j in accordance with the e-mail address of the terminal 3-j.

Figure 21A:
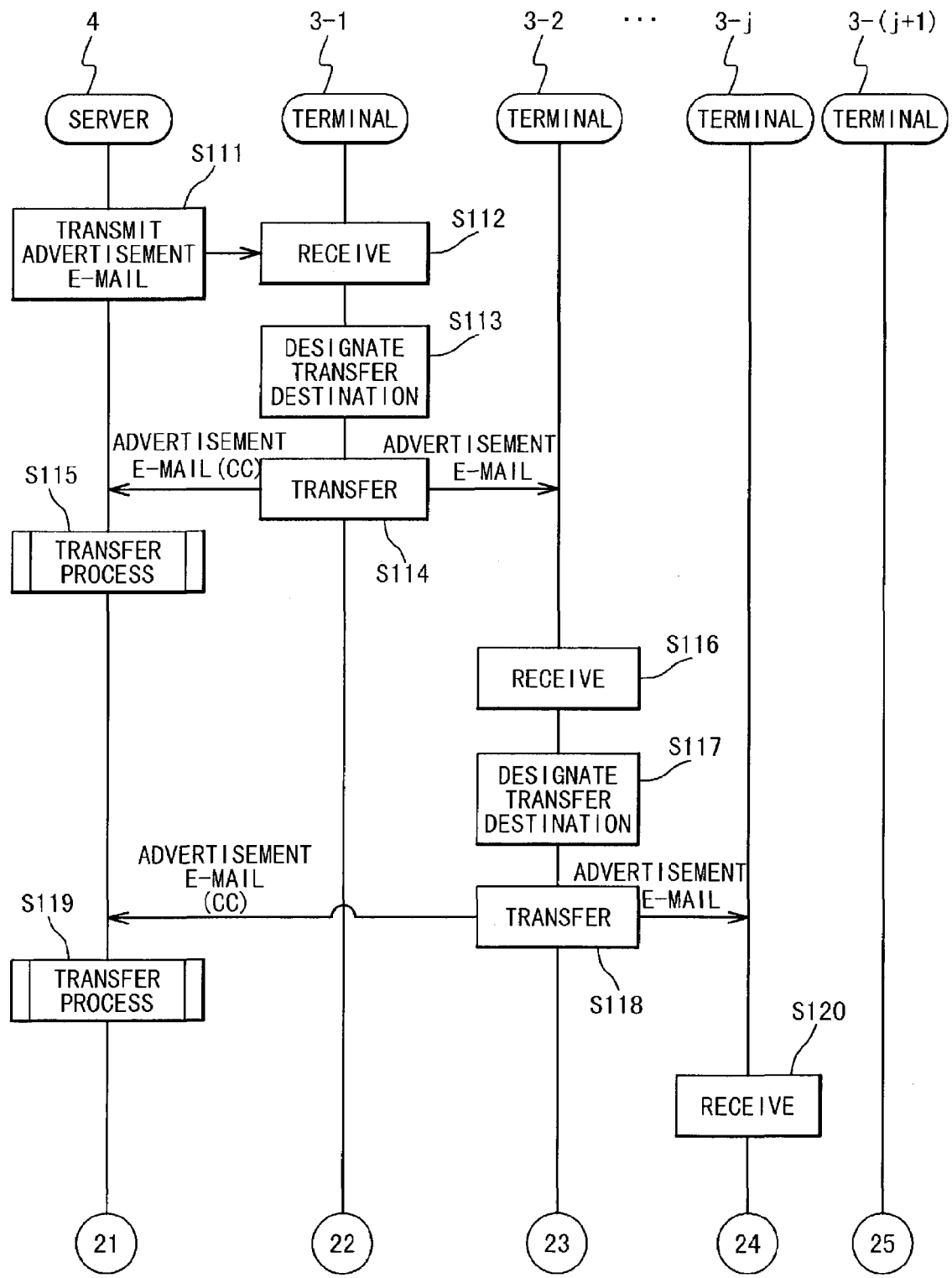
FIGS. 21A to 21C are flow charts showing the operation of the e-mail transfer system according to the second embodiment of the present invention.
Figure 21B:
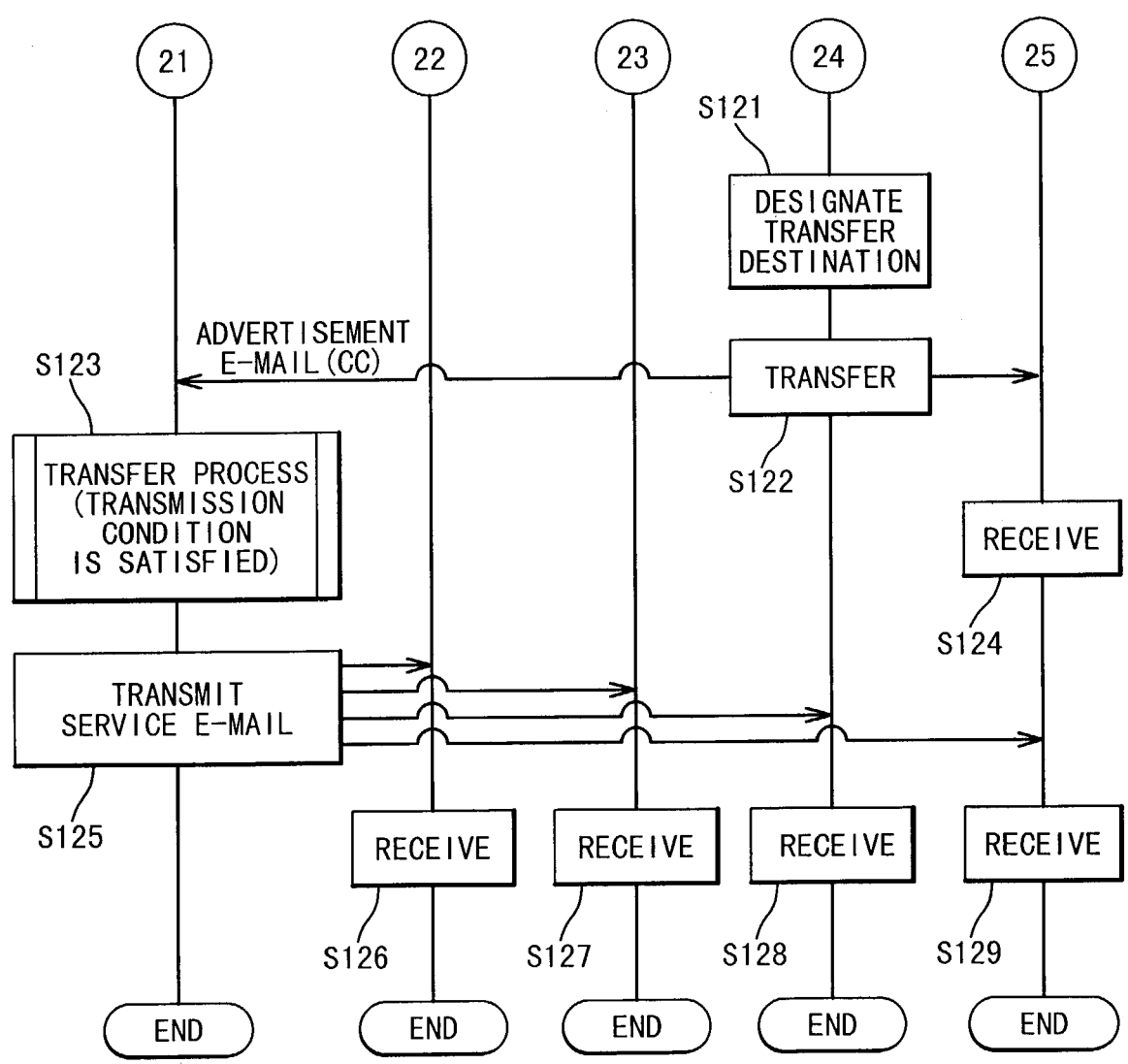
Figure 21C:
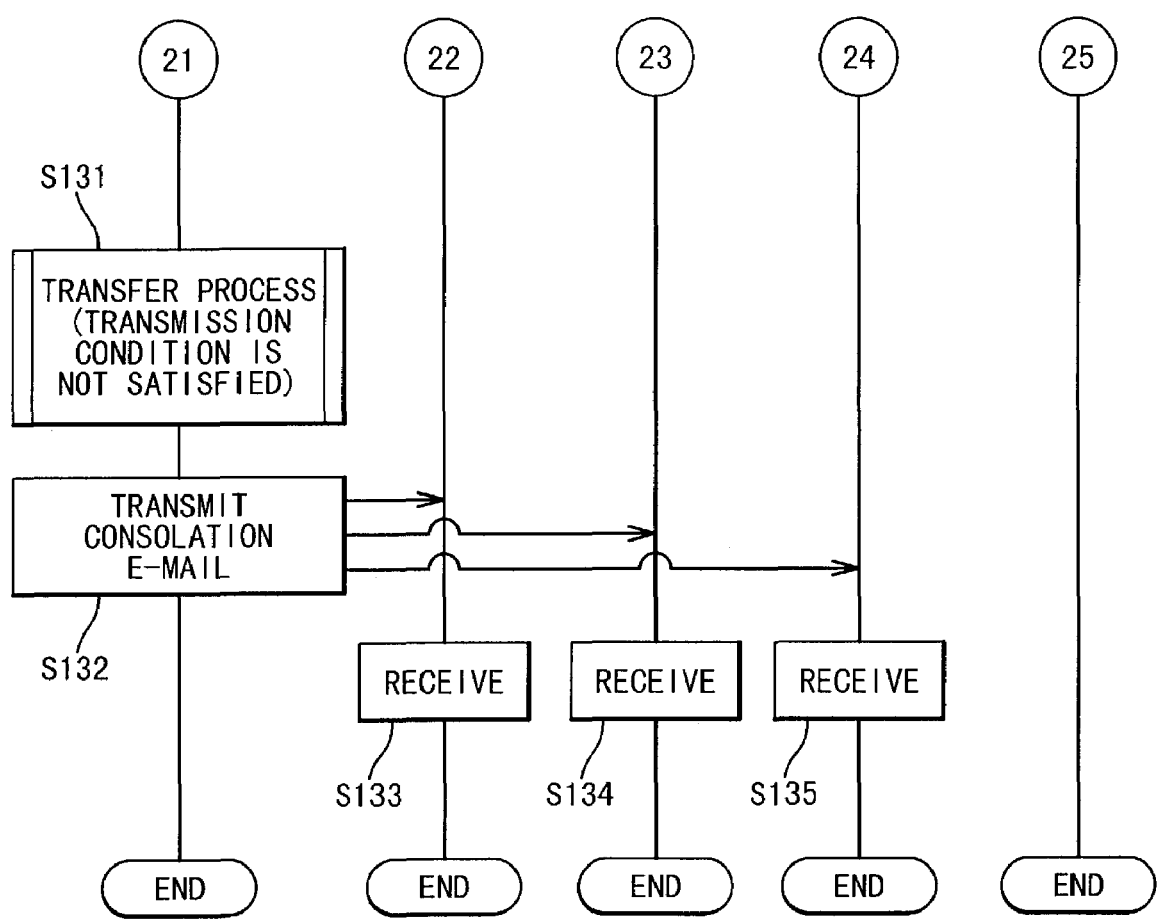

The operation of the service e-mail providing system according to the second embodiment will be described below. FIGS. 21A to 21C are flowcharts showing the operation of the service e-mail providing system according to the second embodiment.

In the service e-mail providing system according to the second embodiment, the e-mail server 4 transmits the service e-mail 10 to the terminals 3-1 to 3-(j+1) after the execution of the steps S1 to S6, as shown in FIG. 14B. In this case, the advertisement e-mail transmitting section 43 refers to the transfer destination e-mail address database 56 and transmits the advertisement e-mail 20 shown in FIG. 20 and containing a transmission condition of the service e-mail 10 to the terminal 3-1 (Step S111). The transmission condition contains the transfer constraint condition of the advertisement e-mail 20. The receiving section 32 of the terminal 3-1 receives the advertisement e-mail 20 from the advertisement e-mail transmitting section 43 (Step S112). The transferring section 35 inputs the e-mail address of the terminal 3-1 to the field 20-3 of the advertisement e-mail 20 in accordance with the operation of the input unit 39 by the transfer person C-1. In addition, the transferring section 35 inputs the e-mail address of the terminal 3-2 to the field 20-4 as the transfer destination e-mail address, and inputs the e-mail address of the e-mail server 4 to the field 30-1 as the transfer destination e-mail address (Step S113). Then, when the button 20-7 is pushed down, the transferring section 35 transfers the advertisement e-mail 20 through the server 104 to the terminal 3-2 and transfers the copy of the advertisement e-mail 20 through the ASP to the e-mail server 4 (Step S114). At the step S114, when the button 20-7 is pushed down, the e-mail address of the terminal 3-1 inputted to the field 20-3 is registered in the field 6-2 of the transfer log 6 associated with the copy (Carbon Copy, referred to as CC) of the advertisement e-mail 20. Also, the e-mail address of the terminal 3-2 inputted to the field 20-4 is registered in the field 6-3. The e-mail server 4 executes the transferring process in accordance with the advertisement e-mail 20 (CC) from the terminal 3-1 (Step S115).

The receiving section 32 of the terminal 3-2 receives the advertisement e-mail 20 from the terminal 3-1 (Step S116). The transferring section 35 inputs the e-mail address of the terminal 3-2 to the field 20-3 of the advertisement e-mail 20 in accordance with the operation of the input unit 39 by the transfer person C-2. In addition, the transferring section 35 inputs the e-mail address of the terminal 3-j to the field 20-4 as the transfer destination e-mail address, and inputs the e-mail address of the e-mail server 4 to the field 30-1 as the transfer destination e-mail address (Step S117). Then, the transferring section 35 transfers the advertisement e-mail 20 through the server 104 to the terminal 3-j, and further transfers the copy of the advertisement e-mail 20 through the ASP to the e-mail server 4 (Step S118). At the step S118, when the button 20-7 is pushed down, the e-mail address of the terminal 3-2 inputted to the field 20-3 is registered in the field 6-2 of the transfer log 6 associated with the advertisement e-mail 20 (CC). Also, the e-mail address of the terminal 3-j inputted to the field 20-4 is registered in the field 6-3. The e-mail server 4 executes the transferring process in accordance with the advertisement e-mail 20 (CC) from the terminal 3-2 (Step S119). The receiving section 32 of the terminal 3-j receives the advertisement e-mail 20 from the terminal 3-2 (Step S120).

As shown in FIG. 21B, the transferring section 35 of the terminal 3-j inputs the e-mail address of the terminal 3-j to the field 20-3 of the advertisement e-mail 20 in accordance with the operation of the input unit 39 by the transfer person C-j. In addition, the transferring section 35 inputs the e-mail address of the terminal 3-(j+1) to the field 20-4 as the transfer destination e-mail address, and inputs the e-mail address of the e-mail server 4 to the field 30-1 as the transfer destination e-mail address (Step S121). Then, when the button 20-7 is pushed down, the transferring section 35 transfers the advertisement e-mail 20 through the e-mail server 4 to the terminal 3-(j+1), and transfers the copy of the advertisement e-mail 20 through the ASP to the e-mail server 4 (Step S122). At the step S122, when the button 20-7 is pushed down, the e-mail address of the terminal 3-j inputted to the field 20-3 is registered in the field 6-2 of the transfer log 6 associated with the advertisement e-mail 20 (CC). Also, the e-mail address of the terminal 3-(j+1) inputted to the field 20-4 is registered in the field 6-3. The receiving section 32 of the terminal 3-(j+1) receives the advertisement e-mail 20 from the terminal 3-j (Step S124). The e-mail server 4 executes the transferring process in accordance with the advertisement e-mail 20 (CC) from the terminal 3-j (Step S123). If the transmission condition is satisfied, the e-mail server 4 transmits the service e-mail 10 stored in the e-mail database 54 to the terminals 3-1 to 3-(j+1) in accordance with the e-mail addresses of the terminals 3-1 to 3-(j+1) (Step S125). The receiving sections 32 of the terminals 3-1 to 3-(j+1) receive the service e-mail 10 from the e-mail server 4 (Steps S126, S127, S128 and S129).

On the other hand, in the service e-mail providing system according to the second embodiment, the steps S111 to S120 shown in FIG. 21A are carried out and the e-mail server 4 carries out the transferring process in accordance with the monitor condition as shown in FIG. 21C (Step S131). If the transmission condition is not satisfied, the e-mail server 4 transmits the consolation e-mail to the terminals 3-1 to 3-j (Step S132). Also, although not shown, at the step S132, the e-mail server 4 transmits the consolation e-mail to the client terminal 1. The receiving sections 32 of the terminals 3-1 to 3-j receive the consolation e-mail from the e-mail server 4 (Steps S133, S134 and S135). The client terminal 1 receives the consolation e-mail from the e-mail server 4.

Figure 22:
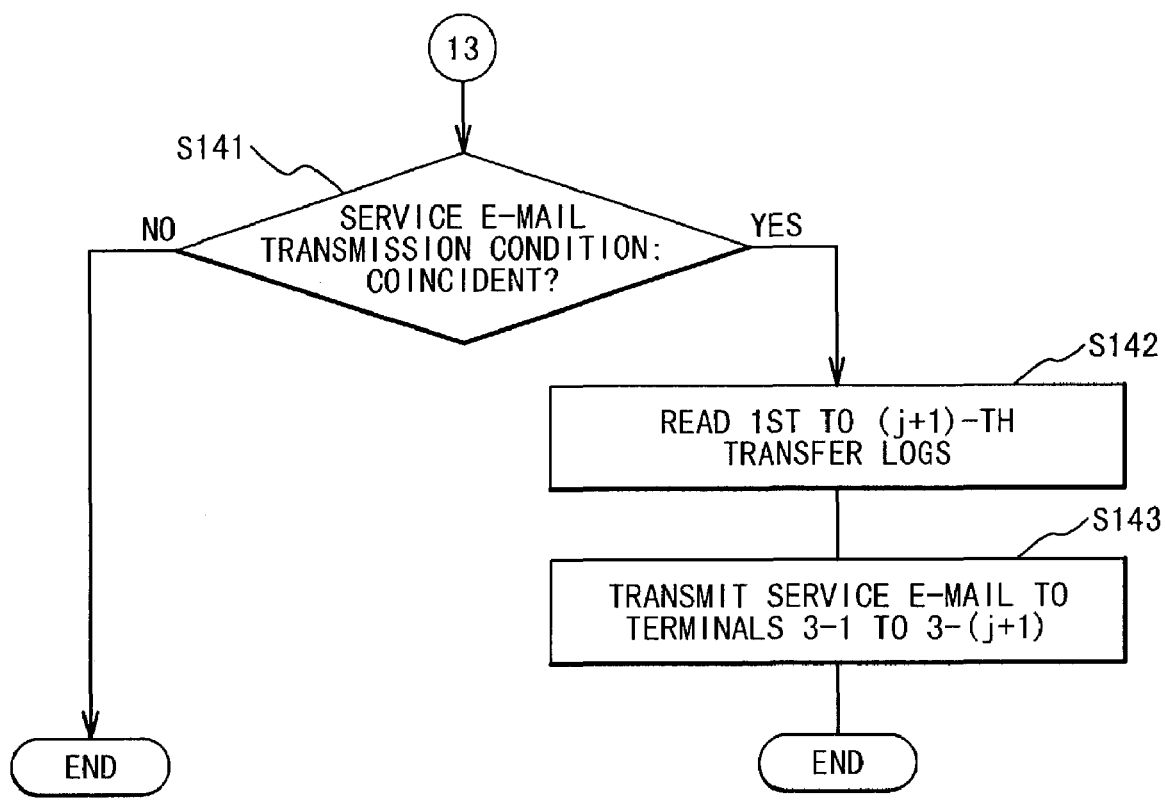
FIG. 22 is a flow chart showing the operation of a transfer process in the mail server 4 of the e-mail transfer system according to second embodiment of the present invention.

FIG. 22 is a flowchart showing the operation of the transferring process in the e-mail server 4 of the service e-mail providing system according to the second embodiment.

The e-mail server 4 executes the steps similar to the steps S41 to S54 and S61 to S64, which are shown in FIGS. 15A, 15B and 15D, and described in the first embodiment. Next, if the monitor condition is not satisfied (Step S52-NO), as shown in FIG. 22, the condition determining section 48 refers to the transfer log database 55 and checks whether or not the transmission condition is coincident (whether or not the transfer count "(j+1)" satisfies the predetermined transfer count n) (Step S141). If the transmission condition is not satisfied (Step S141-NO), the e-mail server 4 ends the transferring process. On the other hand, if the transmission condition is satisfied (Step S141-YES), the service e-mail transmitting section 43 refers to the transfer log database 55, and reads the first to (j+1)-th transfer logs (Step S142). Then, the service e-mail transmitting section 43 transmits the service e-mail 10 stored in the e-mail database 54 to the terminals 3-1 to 3-(j+1) in accordance with the e-mail addresses of the terminals 3-1 to 3-(j+1) (Step S143).

Also, the e-mail server 4 executes the steps similar to the steps S71 to S85, which are shown in FIGS. 16A to 16C and described in the first embodiment, as the transfer constraint condition determining process. Also, the e-mail server 4 executes the steps similar to the steps S91 to S95 and S101 to S110, which are shown in FIGS. 17 and 18 and described in the first embodiment.

Figure 23:
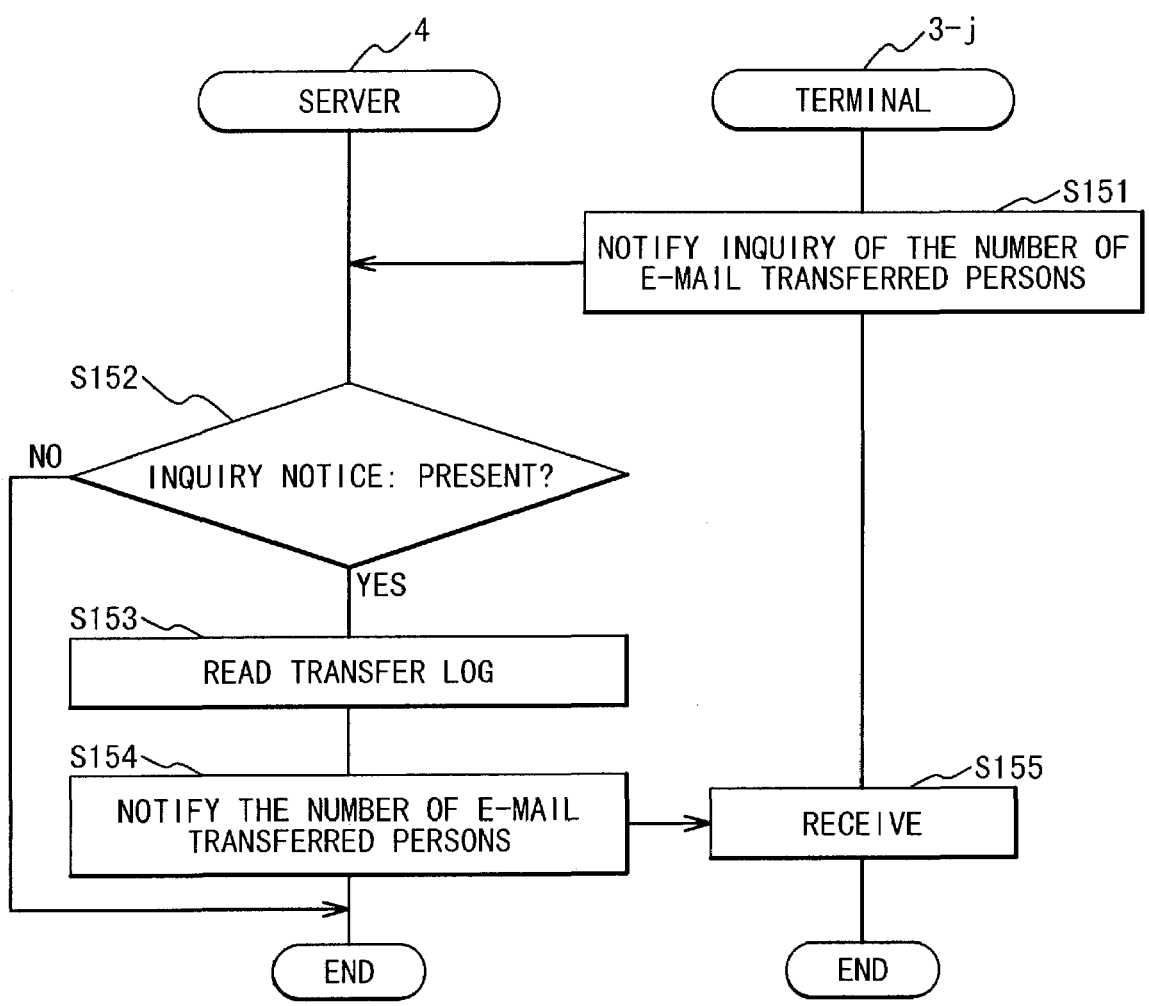
FIG. 23 is a flow chart showing the operation of the e-mail transfer system according to second embodiment of the present invention.

Also, the transfer person C-j operates the input unit 39 to check the order of the transfer person C-j. The transferring section 35 transmits the transfer person count inquiry notice to the e-mail server 4 to inquiry the count value registered in the transfer log database 55, as shown in FIG. 23 (Step S151). The advertisement e-mail receiving section 44 of the e-mail server 4 receives the transfer person count inquiry notice from the transfer person C-j (Step S152). The log recording section 47 refers to the transfer log database 55 in accordance with the transfer person count inquiry notice, and reads the count value at the time of the reception of the transfer person count inquiry notice from the transfer person C-j (Step S153). The advertisement e-mail transmitting section 43 transmits the count value to the terminal 3-j in accordance with the e-mail address of the terminal 3-j (Step S154). The terminal 3-j receives the count value from the advertisement e-mail transmitting section 43 (Step S155).

It should be noted that in the service e-mail providing system of the present invention, the condition determining section 48 refers to the transfer constraint condition database 57 and checks whether or not the transfer constraint condition is satisfied. However, the present invention is not limited this. It is possible to refer to the service e-mail transmission condition database 58 to thereby check whether or not the transfer constraint condition is satisfied. Also, in the service e-mail providing system of the present invention, in accordance with the result determined by the condition determining section 48, the alert transmitting section 49 transmits the alert. However, the advertisement e-mail transmitting section 43 can also transmit the alert.

In the above embodiment, the transmission condition and the transfer constraint condition are transmitted from the advertiser terminal to the e-mail server 4. However, the transmission condition and the transfer constraint condition may be transmitted from the client terminal to the e-mail server 4.

As mentioned above, according to the service e-mail providing system of the present invention, the client A can distribute the data associated with the service e-mail 10 through the advertisement e-mail 20 to the persons who are not registered in the client terminal 1, e.g., the transfer persons C-2 to C-n, in addition to the person registered in the client terminal 1, e.g., the transfer person C-1.

Also, according to the service e-mail providing system of the present invention, it is possible to preliminarily notify that the service e-mail 10 is transmitted to the transfer persons C-2 to C-n by the advertisement e-mail 20, i.e., the advertisement e-mail 20 having the advertisement data of the advertiser B. Thus, the advertiser B can distribute the advertisement data such as advertisement, CM and posters to the persons who are not registered in the advertiser terminal 2, e.g., the transfer persons C-2 to C-n, in addition to the person registered in the advertiser terminal 2, e.g., the transfer person C-1.

Also, according to the service e-mail providing system of the present invention, the account destination can be flexibly changed using the transfer log database 55 and the personal profile database 59.

Also, according to the service e-mail providing system of the present invention, if the plurality of server 4s 104 are connected to the communication network 5, the e-mail server 4 can acquire the transfer log 6 based on the copy of the advertisement e-mail 20 transferred through the ASP.

What is claimed is:

1. A service e-mail providing system comprising:
    n (n is an integer more than m, and m is an integer more than 1) terminals which are connected a communication network; and
    an e-mail server which is connected with said communication network, and has an e-mail database in which a service e-mail and an advertisement e-mail are stored,
    wherein said advertisement e-mail contains advertisement data,
    said e-mail server transmits said advertisement e-mail to a first one of m terminal of said n terminals, such that said advertisement e-mail are transferred between said m terminals, users of said m terminals satisfying a transfer constraint condition, and
    when a transmission condition is satisfied during the transfer of said advertisement e-mail, said e-mail server transmits said service e-mail to said m terminals.

2. The service e-mail providing system according to claim 1, wherein said e-mail server has a service e-mail transmission condition database which stores said transmission condition,
    said transmission condition contains a predetermined count value, and said e-mail server determines that said transmission condition is satisfied, when a number of times of the transfer of said advertisement e-mail reaches said predetermined count value.

3. The service e-mail providing system according to claim 2, wherein said transmission condition contains a transfer time limit in addition to said predetermined count value, and said e-mail server determines that said transmission condition is satisfied, when the number of times of the transfer of said advertisement e-mail reaches said predetermined count value, before said transfer time limit passed away.

4. The service e-mail providing system according to claim 3, wherein said e-mail server determines that said transmission condition is not satisfied, when the number of times of the transfer of said advertisement e-mail does not reach said predetermined count value, before said transfer time limit passed away, and said e-mail server transmits a consolation e-mail to ones of said m terminals to which said advertisement e-mail has been transferred.

5. The service e-mail providing system according to claim 1, wherein said e-mail server receives a specific e-mail, when a transfer source terminal as one of said m terminals transfers said advertisement e-mail to a transfer destination terminal as another of said m terminals, while said advertisement e-mail is transferred between said m terminals, and said e-mail server checks whether said transmission condition is satisfied, when said specific e-mail is received by said e-mail server.

6. The service e-mail providing system according to claim 5, wherein said specific e-mail is said advertisement e-mail.

7. The service e-mail providing system according to claim 5, wherein said specific e-mail is a copy of said advertisement e-mail.

8. The service e-mail providing system according to claim 5, wherein said e-mail server extracts an e-mail address of said transfer source terminal and an e-mail address of said transfer destination terminal from the received specific e-mail, and when said transfer condition is satisfied, said e-mail server transmits said service e-mail to said m terminals based on said e-mail addresses extracted during the transfer of said advertisement e-mail between said m terminal.

9. The service e-mail providing system according to claim 8, wherein said e-mail server checks whether said e-mail address of the extracted transfer destination terminal is coincident with any of e-mail addresses already extracted, and when said e-mail address of the extracted transfer destination terminal is coincident with any of e-mail addresses already extracted, said e-mail server transmits a first alert e-mail to said transfer source terminal to instruct said transfer source terminal to set an e-mail address of another terminal in said advertisement e-mail instead of the e-mail address currently set.

10. The service e-mail providing system according to claim 5, wherein said transfer constraint condition contains a predetermined destination location, said e-mail server checks whether a location of said transfer destination terminal satisfies said predetermined destination location, and when the location of said transfer destination terminal does not satisfy said predetermined destination location, said e-mail server transmits a second alert to said transfer source terminal to instruct said transfer source terminal to set an e-mail address of another terminal located in said predetermined destination location in said advertisement e-mail instead of the e-mail address currently set.

11. The service e-mail providing system according to claim 5, wherein said transfer constraint condition contains a predetermined attribute of said user, said e-mail server checks whether an attribute of said user of said transfer destination terminal satisfies said predetermined attribute of said user, and when the attribute of said,user of said transfer destination terminal does not satisfy said predetermined attribute of said user, said e-mail server transmits a third alert to said transfer source terminal to instruct said transfer source terminal to set in said advertisement e-mail instead of the e-mail address currently set, an e-mail address of another terminal whose user satisfies said predetermined attribute.

12. The service e-mail providing system according to claim 5, wherein said e-mail server holds a count value of a number of times of the transfer of said advertisement e-mail, said transfer destination terminal displays said advertisement e-mail when receiving said advertisement e-mail, and generates a progress inquiry notice in response to an operation of said transfer destination terminal, said e-mail server transmits said count value to said transfer destination terminal in response to said progress inquiry notice, and said transfer destination terminal displays the count value.

13. The service e-mail providing system according to claim 1, wherein said e-mail server further comprises a fee charging section which transmits a communication fee e-mail notice for said advertisement e-mail to said m terminals.

14. The service e-mail providing system according to claim 1, wherein when said fee charging section receives an account change notice from one of said m terminals before transmitting said communication fee e-mail notice to said one terminal, said fee charging section transmits said communication charge e-mail to said one terminal.

15. The service e-mail providing system according to claim 1, further comprising first and second terminals, wherein said first terminal transmits said service e-mail to said e-mail server, said second terminal transmits an e-mail containing specific data and a condition e-mail containing said transmission condition and said transfer constraint condition to said e-mail server, and said e-mail server produce said advertisement e-mail based on said specific data, said transmission condition and said transfer constraint condition.

16. The service e-mail providing system according to claim 1, further comprising first and second terminals, wherein said first terminal transmits said service e-mail and a condition e-mail containing said transmission condition and said transfer constraint condition to said e-mail server, said second terminal transmits an e-mail containing specific data to said e-mail server, and said e-mail server produce said advertisement e-mail based on said specific data, said transmission condition and said transfer constraint condition.

17. An e-mail transfer server connected with n terminals (n is an integer more than 2) via a communication network, comprises:

an e-mail database which stores a service e-mail and an advertisement e-mail;

an advertisement e-mail transmitting section which transmits an advertisement e-mail to a first terminal of said n terminals;

an advertisement e-mail receiving section which receives said advertisement e-mail while said advertisement e-mail is sequentially transferred from a transfer source terminal of said n terminals to a transfer destination terminal of said n terminals, the received advertisement e-mail contains an e-mail addresses of said transfer source terminal and an e-mail address of said transfer destination terminal;

an address extracting section which extracts said e-mail addresses of said transfer source terminal and said transfer destination terminal from the received advertisement e-mail; and a service e-mail transmitting section which transmits said service e-mail to said n terminals based on the extracted e-mail addresses when a transmission condition of said service e-mail is satisfied, and said n terminals satisfies a transfer constraint condition of said advertisement e-mail.

18. The e-mail transfer server according to claim 17, further comprising:

a condition determining section, wherein said advertisement e-mail contains a predetermined transfer count value as said transmission condition, said condition determining section checks whether said current transfer count value satisfies said predetermined transfer count value, and said service e-mail transmitting section transmits said service e-mail to said n terminals based on the extracted e-mail addresses when said current transfer count value satisfies said predetermined transfer count value.

19. The e-mail transfer server according to claim 18, further comprising:

a monitoring section; and a consolation e-mail transmitting section, wherein said transmission condition contains a predetermined time limit, said monitoring section checks whether a predetermined time limit passed, and said consolation e-mail transmitting section transmits a consolation e-mail to said n terminals based on the extracted e-mail addresses to notify that said transmission condition is not satisfied when said predetermined time limit passed without satisfying said predetermined transfer count value.

20. The e-mail transfer server according to claim 18, wherein said condition determining section determines whether said e-mail address of said transfer destination terminal is equal to any of e-mail addresses already extracted when said address extracting section extracts said e-mail address of said transfer destination terminal from the received advertisement e-mail, and when said e-mail address of said transfer destination terminal is equal to any of said e-mail addresses already extracted, said advertisement e-mail transmitting section transmits a first alert e-mail to said transfer source terminal to instruct said transfer source terminal to set in said advertisement e-mail, an e-mail address of another transfer destination terminal other than terminals corresponding to the e-mail addresses already extracted.

21. The e-mail transfer server according to claim 18, wherein said advertisement e-mail transmitting section writes said current transfer count value in said advertisement e-mail transferred to said transfer destination terminal, and said current transfer count value is j+1.

22. The e-mail transfer server according to claim 18, wherein said advertisement e-mail receiving section receives a transfer count value inquiry notice from said transfer destination terminal, and said advertisement e-mail transmitting section transmits said current transfer count value to said transfer destination terminal in response to transfer count value inquiry notice.

23. The e-mail transfer server according to claim 17, wherein a current destination location of said transfer destination terminal is contained in said received advertisement e-mail, said transfer constraint condition contains transfer constraint condition which contains a predetermined destination location, said condition determining section checks whether said current destination location satisfies said predetermined destination location, and when said current destination location does not satisfy said predetermined destination location, said advertisement e-mail transmitting section transmits a second alert e-mail to said transfer source terminal to instruct said transfer source terminal to set in said advertisement e-mail, an e-mail address of another transfer destination terminal satisfying said predetermined destination location.

24. The e-mail transfer server according to claim 17, wherein said transfer constraint condition contains a predetermined attribute, said condition determining section checks whether an attribute of a user of said transfer destination terminal satisfies said predetermined attribute, and when said attribute of said destination does not satisfy said predetermined attribute, said advertisement e-mail transmitting section transmits a third alert e-mail to said transfer source terminal to instruct said transfer source terminal to set in said advertisement e-mail, an e-mail address of another transfer destination terminal satisfying said predetermined attribute.

25. The e-mail transfer server according to claim 17, wherein said advertisement e-mail received by said advertisement e-mail receiving section is a copy of said advertisement e-mail which is transferred from said transfer source terminal to said transfer destination terminal.

26. The e-mail transfer server according to claim 17, further comprising:

a fee charging section which transmits a communication fee notice showing a communication fee of said advertisement e-mail.

27. The e-mail transfer server according to claim 26, wherein said fee charging section transmits said communication fee notice to one of said n terminals when receiving an account change notice from said one terminal of said n terminals, before transmitting said communication fee notice to said one terminal.

28. A recording medium storing a program for an e-mail transfer method in an e-mail server connected with n terminals (n is an integer more than 2) via a communication network, said method comprises:

(a) transmitting an advertisement e-mail to a first terminal of said n terminals;

(b) receiving said advertisement e-mail while said advertisement e-mail is sequentially transferred from a transfer source terminal of said n terminals to a transfer destination terminal of said n terminals, the received advertisement e-mail contains an e-mail addresses of said transfer source terminal and an e-mail address of said transfer destination terminal;

(c) extracting said e-mail addresses of said transfer source terminal and said transfer destination terminal from the received advertisement e-mail; and (d) transmitting a service e-mail to said n terminals based on the extracted e-mail addresses when a transmission condition of said service e-mail is satisfied, and said n terminals satisfies a transfer constraint condition of said advertisement e-mail.

29. The recording medium according to claim 28, wherein said advertisement e-mail contains a predetermined transfer count value as said transmission condition, and said method further comprising:

checking whether said current transfer count value satisfies said predetermined transfer count value; and said (d) transmitting step includes transmitting said service e-mail to said n terminals based on the extracted e-mail addresses when said current transfer count value satisfies said predetermined transfer count value.

30. The e-mail transfer server according to claim 29, wherein said transmission condition contains a predetermined time limit, and said method further comprises:

checking whether a predetermined time limit passed; and transmitting a consolation e-mail to said n terminals based on the extracted e-mail addresses to notify that said transmission condition is not satisfied when said predetermined time limit passed without satisfying said predetermined transfer count value.

31. The recording medium according to claim 29, wherein said method further comprises:

checking whether said e-mail address of said transfer destination terminal is equal to any of e-mail addresses already extracted when said address extracting section extracts said e-mail address of said transfer destination terminal from the received advertisement e-mail; and when said e-mail address of said transfer destination terminal is equal to any of said e-mail addresses already extracted, transmitting a first alert e-mail to said transfer source terminal to instruct said transfer source terminal to set in said advertisement e-mail, an e-mail address of another transfer destination terminal other than terminals corresponding to the e-mail addresses already extracted.

32. The recording medium according to claim 29, wherein said current transfer count value is written in said advertisement e-mail transferred to said transfer destination terminal, and said current transfer count value is j+1.

33. The recording medium according to claim 32, wherein said method further comprises:

transmitting said current transfer count value to said transfer destination terminal in response to transfer count value inquiry notice from said transfer destination terminal.

34. The recording medium according to claim 28, wherein a current destination location of said transfer destination terminal is contained in said received advertisement e-mail, said transfer constraint condition contains transfer constraint condition which contains a predetermined destination location, and said method further comprises:

checking whether said current destination location satisfies said predetermined destination location; and when said current destination location does not satisfy said predetermined destination location, transmitting a second alert e-mail to said transfer source terminal to instruct said transfer source terminal to set in said advertisement e-mail, an e-mail address of another transfer destination terminal satisfying said predetermined destination location.

35. The recording medium according to claim 28, wherein said transfer constraint condition contains a predetermined attribute, said method further comprises:

checking whether an attribute of a user of said transfer destination terminal satisfies said predetermined attribute; and when said attribute of said destination does not satisfy said predetermined attribute, transmitting a third alert e-mail to said transfer source terminal to instruct said transfer source terminal to set in said advertisement e-mail, an e-mail address of another transfer destination terminal satisfying said predetermined attribute.

36. The recording medium according to claim 28, wherein said received advertisement e-mail is a copy of said advertisement e-mail which is transferred from said transfer source terminal to said transfer destination terminal.

37. The recording medium according to claim 28, further comprising:

transmitting a communication fee notice showing a communication fee of said advertisement e-mail.

38. The recording medium according to claim 37, wherein said method further comprising:

transmitting said communication fee notice to one of said n terminals when receiving an account change notice from said one terminal of said n terminals, before transmitting said communication fee notice to said one terminal.

* * * * *

UNITED STATES PATENT AND TRADEMARK OFFICE
CERTIFICATE OF CORRECTION

PATENT NO. : 7,203,727 B2 Page 1 of 1
APPLICATION NO. : 10/366417
DATED : April 10, 2007
INVENTOR(S) : Shintaro Suzuki and Takeshi Fukuizumi It is certified that error appears in the above-identified patent and that said Letters Patent is hereby corrected as shown below:

On the Title Page Item (54) insert (A) at beginning of the title.

Col. 1, line 1, insert --A-- at the beginning of the title

Signed and Sealed this

Thirty-first Day of March, 2009

JOHN DOLL
*Acting Director of the United States Patent and Trademark Office*